US012757232B2

(12) United States Patent
Elshafie et al.

(10) Patent No.: US 12,757,232 B2
(45) Date of Patent: Oct. 6, 2026

(54) CONFIGURATION BASED ON TRAFFIC PRIORITY AND QUALITY-OF-SERVICE AWARENESS BETWEEN USER EQUIPMENT

(71) Applicant: QUALCOMM Incorporated, San Diego, CA (US)

(72) Inventors: Ahmed Elshafie, San Diego, CA (US); Diana Maamari, San Diego, CA (US); Seyedkianoush Hosseini, San Diego, CA (US); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 464 days.

(21) Appl. No.: 18/069,533

(22) Filed: Dec. 21, 2022

(65) Prior Publication Data

US 2024/0215053 A1 Jun. 27, 2024

(51) Int. Cl.
*H04W 72/40* (2023.01)
*H04W 72/543* (2023.01)
*H04W 72/566* (2023.01)

(52) U.S. Cl.
CPC ......... *H04W 72/40* (2023.01); *H04W 72/543* (2023.01); *H04W 72/569* (2023.01)

(58) Field of Classification Search
None
See application file for complete search history.

(56) References Cited

U.S. PATENT DOCUMENTS

| | | | | |
|---|---|---|---|---|
| 11,452,088 | B2 * | 9/2022 | Lee | H04W 72/56 |
| 12,256,244 | B2 * | 3/2025 | Freda | H04L 1/1812 |
| 2020/0163005 | A1 * | 5/2020 | Rao | H04W 4/44 |
| 2020/0322939 | A1 * | 10/2020 | Cao | H04W 72/02 |
| 2021/0105787 | A1 * | 4/2021 | Park | H04W 72/542 |
| 2022/0015133 | A1 * | 1/2022 | Fong | H04L 1/0061 |
| 2022/0116915 | A1 * | 4/2022 | Zhou | H04L 5/0053 |
| 2022/0167311 | A1 * | 5/2022 | Xue | H04W 72/02 |
| 2022/0279536 | A1 * | 9/2022 | Khsiba | H04W 72/1263 |
| 2022/0330304 | A1 * | 10/2022 | Hahn | H04W 72/23 |
| 2022/0346118 | A1 * | 10/2022 | Wu | H04L 1/1819 |

* cited by examiner

*Primary Examiner* — Kodzovi Acolatse
(74) *Attorney, Agent, or Firm* — Harrity & Harrity LLP

(57) ABSTRACT

Various aspects of the present disclosure generally relate to wireless communication. In some aspects, a first user equipment (UE) may transmit, to a second UE or a controller associated with a sidelink, information indicating a quality-of-service parameter associated with traffic of the first UE. The UE may communicate in accordance with the information. Numerous other aspects are described.

29 Claims, 12 Drawing Sheets

CONFIGURATION BASED ON TRAFFIC PRIORITY AND QUALITY-OF-SERVICE AWARENESS BETWEEN USER EQUIPMENT

FIELD OF THE DISCLOSURE

Aspects of the present disclosure generally relate to wireless communication and to techniques and apparatuses for configuration based on traffic priority and quality-of-service awareness between user equipment (UEs).

BACKGROUND

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and types of wireless communications mediums available for use, and the like. Consequently, there exists a need for further improvements in wireless communications systems to overcome the aforementioned technical challenges and others.

SUMMARY

One aspect provides a method for wireless communication by a first user equipment (UE). The method includes transmitting, to a second UE or a controller associated with a sidelink, information indicating a quality-of-service parameter associated with traffic of the first UE; and communicating in accordance with the information.

Another aspect provides a method for wireless communication by a first UE. The method includes receiving, from a second UE or a controller associated with a sidelink, information indicating a quality-of-service parameter associated with traffic of the second UE; and communicating in accordance with the information.

Other aspects provide: an apparatus operable, configured, or otherwise adapted to perform any one or more of the aforementioned methods and/or those described herein with reference to and as illustrated by the drawings; a non-transitory, computer-readable medium comprising computer-executable instructions that, when executed by a processor of an apparatus, cause the apparatus to perform the aforementioned methods and/or those described herein with reference to and as illustrated by the drawings; a computer program product embodied on a computer-readable storage medium comprising code for performing the aforementioned methods and/or those described herein with reference to and as illustrated by the drawings; and/or an apparatus comprising means for performing the aforementioned methods and/or those described herein with reference to and as illustrated by the drawings. By way of example, an apparatus may comprise a processing system, a device with a processing system, or processing systems cooperating over one or more networks.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
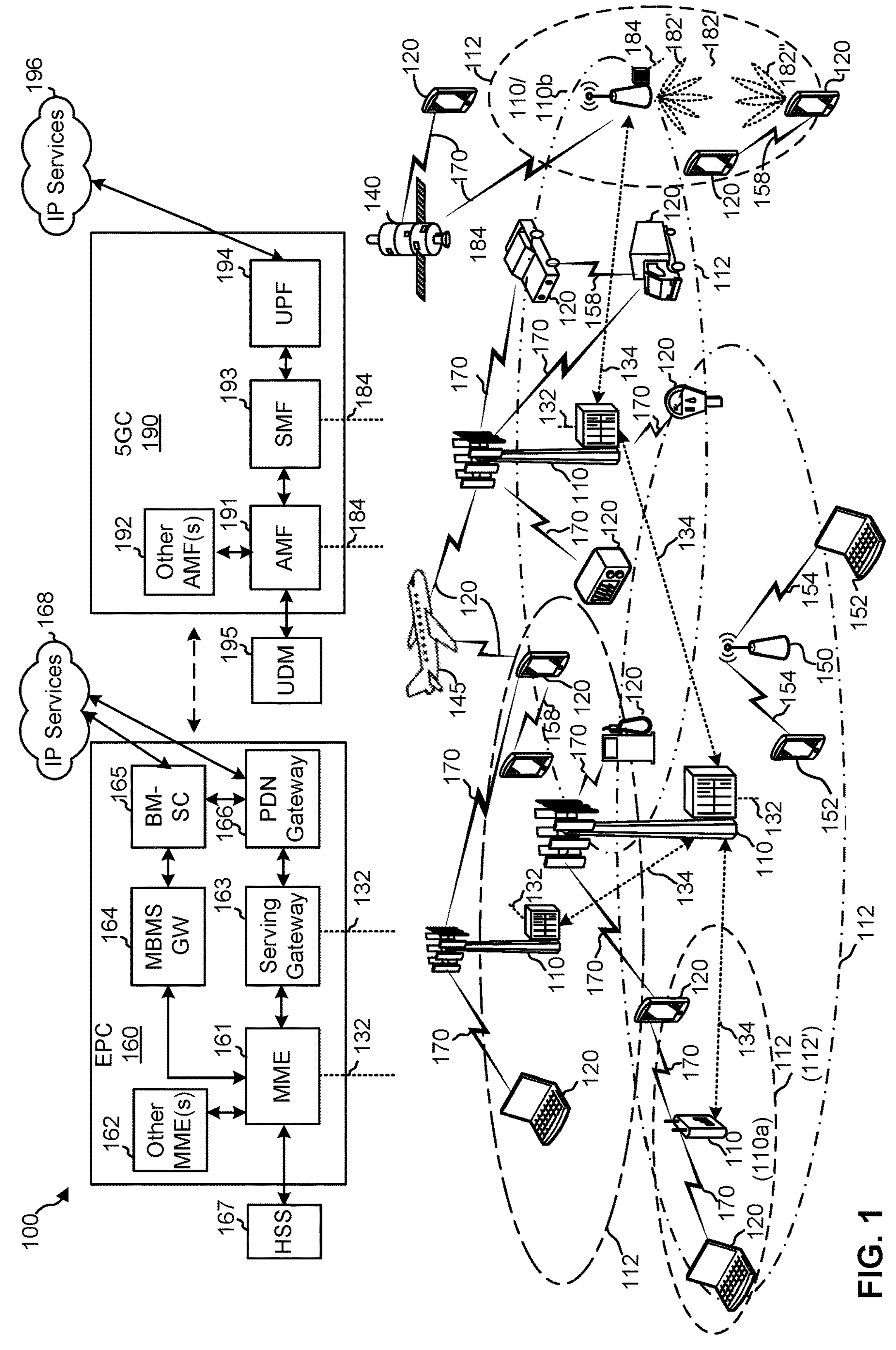
FIG. 1 depicts an example of a wireless communications network, in accordance with the present disclosure.

Aspects of the present disclosure provide apparatuses, methods, processing systems, and computer-readable mediums for configuration based on traffic priority and quality-of-service awareness between user equipment.

User equipment (UEs) can communicate with one another via sidelink communications. A sidelink communication is a communication directly from one UE to another UE that does not flow via, for example, a base station. In some examples, a network entity (e.g., a base station) may handle scheduling of sidelink communications between the UEs. In some other examples, the UEs may select resources for sidelink communications between the UEs (e.g., the network may not be directly involved in the resource selection). In some cases, communications between UEs may have diverse and variable requirements (such as latency requirements, reliability requirements, or the like). For example, ultra-reliable low-latency communication (URLLC), Industrial Internet of Things (IIOT), and extended reality (XR) services may have a diverse set of latency and/or reliability requirements. Some applications may require a tight latency while reliability is relaxed, some applications may require stringent reliability (e.g., 1e-6 block error rate (BLER)) while the required latency is relaxed, and some applications may have both stringent latency and reliability requirements, such as 1 ms latency with 1e-6 BLER. However, sidelink communications may lack mechanisms for ensuring latency and reliability requirements are met. Furthermore, sidelink scheduling may use resource selection schemes that can lead to overlapping selection of resources and prioritization of certain transmissions over other transmissions, when the other transmissions might in fact have more stringent latency/reliability requirements or be closer to an expiration of a packet delay budget (PDB) than the prioritized transmissions. This may cause failure to adhere to latency and/or reliability requirements as well as dropped transmissions.

Some techniques described herein provide indication, by a first UE (e.g., a transmitting UE) to a second UE, of a quality-of-service (QoS) parameter of traffic of the first UE. The first UE may also indicate a PDB of the traffic. The second UE may communicate in accordance with the indication. For example, the second UE may determine parameters for a transmission of the second UE, or may select resources for the transmission of the second UE, based at least in part on the QoS parameter or the PDB.

Thus, sidelink resource selection and communication can take into account QoS parameters and/or PDBs of sidelink communications, which provides improved adherence to latency and/or reliability requirements and improves the reliability of sidelink transmissions.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 depicts an example of a wireless communications network 100, in accordance with the present disclosure.

Generally, wireless communications network 100 includes various network entities (alternatively, network elements or network nodes). A network entity is generally a communications device and/or a communications function performed by a communications device (e.g., a UE, a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 110), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 110, UEs 120, and one or more core networks, such as an Evolved Packet Core (EPC) 160 and 5G Core (5GC) 190, which interoperate to provide communications services over various communications links, including wired and wireless links.

FIG. 1 depicts various example UEs 120, which may include a cellular phone, a smart phone, a session initiation protocol (SIP) phone, a laptop, a personal digital assistant (PDA), a satellite radio, a global positioning system (GPS), a multimedia device, a video device, a digital audio player, a camera, a game console, a tablet, a smart device, a wearable device, a vehicle, an electric meter, a gas pump, a kitchen appliance, a healthcare device, an implant, a sensor/actuator, a display, an internet of things (IoT) device, an always on (AON) device, an edge processing device, or another similar device. A UE 120 may also be referred to as a mobile device, a wireless device, a wireless communication device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, or a handset, among other examples.

BSs 110 may wirelessly communicate with (e.g., transmit signals to or receive signals from) UEs 120 via communications links 170. The communications links 170 between BSs 110 and UEs 120 may carry uplink (UL) (also referred to as reverse link) transmissions from a UE 120 to a BS 110 and/or downlink (DL) (also referred to as forward link) transmissions from a BS 110 to a UE 120. The communications links 170 may use multiple-input and multiple-output (MIMO) antenna technology, including spatial multiplexing, beamforming, and/or transmit diversity in various aspects.

A BS 110 may include, for example, a NodeB, an enhanced NodeB (eNB), a next generation enhanced NodeB (ng-eNB), a next generation NodeB (gNB or gNodeB), an access point, a base transceiver station, a radio base station, a radio transceiver, a transceiver function, a transmission reception point, and/or others. A BS 110 may provide communications coverage for a respective geographic coverage area 112, which may sometimes be referred to as a cell, and which may overlap in some cases (e.g., a small cell provided by a BS 110*a* may have a coverage area 112' that overlaps the coverage area 112 of a macro cell). A BS 110 may, for example, provide communications coverage for a macro cell (covering a relatively large geographic area), a pico cell (covering a relatively smaller geographic area, such as a sports stadium), a femto cell (covering a relatively smaller geographic area (e.g., a home)), and/or other types of cells.

Figure 3:
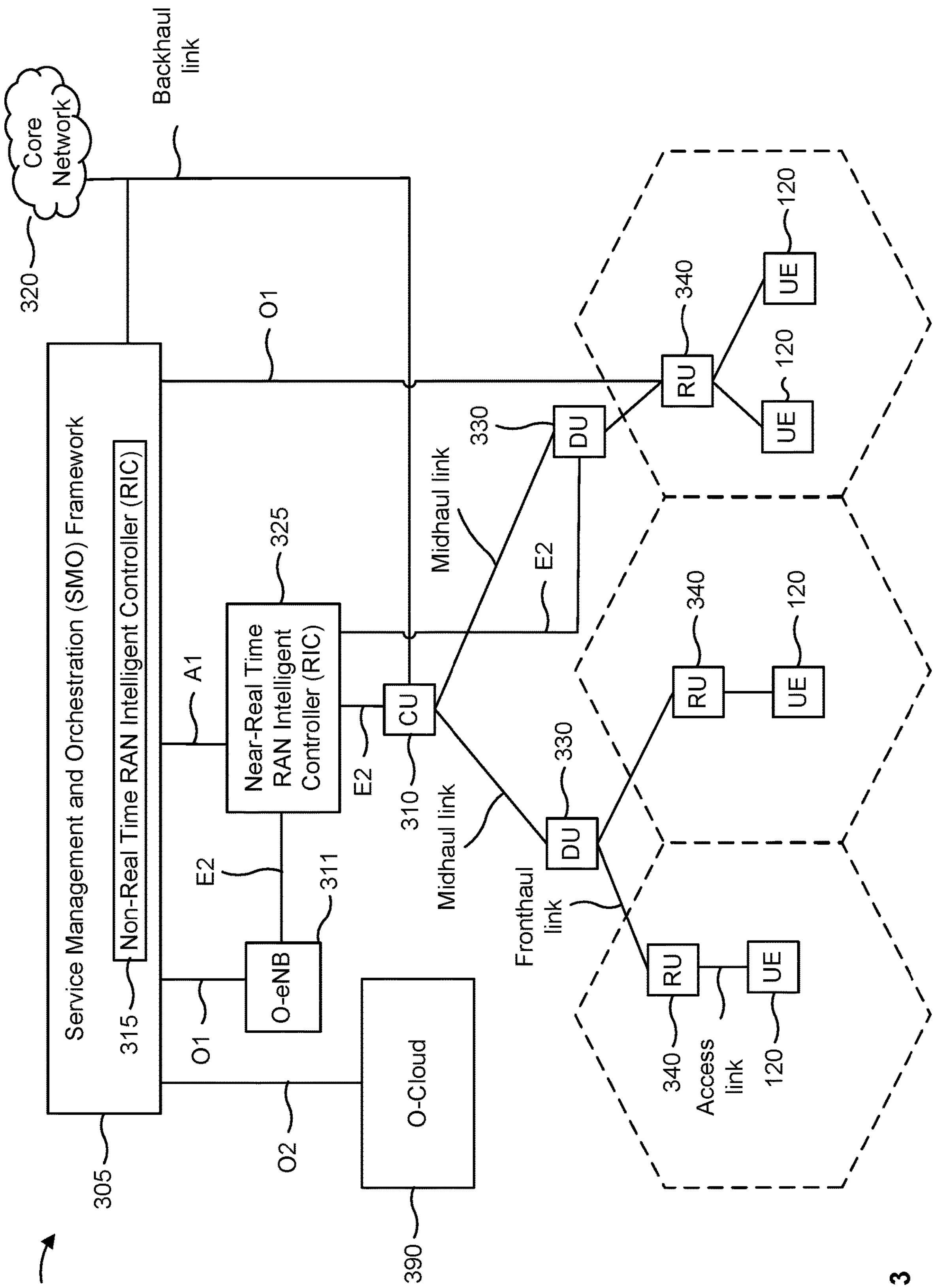
FIG. 3 depicts an example disaggregated base station architecture.

While BSs 110 are depicted in various aspects as unitary communications devices, BSs 110 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a BS (e.g., BS 110) may include components that are located at a single physical location or components located at various physical locations. In examples in which a BS includes components that are located at various physical locations, the various components may each perform functions such that, collectively, the various components achieve functionality that is similar to a BS that is located at a single physical location. In some aspects, a BS including components that are located at various physical locations may be referred to as having a disaggregated radio access network architecture, such as an Open RAN (O-RAN) architecture or a Virtualized RAN (VRAN) architecture. FIG. 3 depicts and describes an example disaggregated BS architecture.

Different BSs 110 within wireless communications network 100 may also be configured to support different radio access technologies, such as 3G, 4G, and/or 5G, among other examples. For example, BSs 110 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 110 configured for 5G (e.g., 5G NR or Next Generation RAN (NG-RAN)) may interface with 5GC 190 through second backhaul links 184. BSs 110 may communicate directly or indirectly (e.g., through the EPC 160 or 5GC 190) with each other over third backhaul links 134 (e.g., X2 interfaces), which may be wired or wireless.

Wireless communications network 100 may subdivide the electromagnetic spectrum into various classes, bands, channels, or other features. In some aspects, the subdivision is based on wavelength and frequency, where frequency may also be referred to as a carrier, a subcarrier, a frequency channel, a tone, or a subband. For example, the 3rd Generation Partnership Project (3GPP) currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave or near mmWave radio frequency bands (e.g., a mmWave base station such as BS 110*b*) may utilize beamforming (e.g., as shown by 182) with a UE (e.g., 120) to improve path loss and range.

The communications links 170 between BSs 110 and, for example, UEs 120, may be through one or more carriers, which may have different bandwidths (e.g., 5 MHz, 10 MHz, 15 MHz, 20 MHz, 100 MHz, 400 MHz, and/or other bandwidths), and which may be aggregated in various aspects. Carriers may or may not be adjacent to each other. In some examples, allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., base station 110*b* in FIG. 1) may utilize beamforming with a UE 120 to improve path loss and range, as shown at 182. For example, BS 110*b* and the UE 120 may each include a plurality of antennas, such as antenna elements, antenna panels, and/or antenna arrays to facilitate the beamforming. In some cases, BS 110*b* may transmit a beamformed signal to UE 120 in one or more transmit directions 182'. UE 120 may receive the beamformed signal from the BS 110*b* in one or more receive directions 182". UE 120 may also transmit a beamformed signal to the BS 110*b* in one or more transmit directions 182". BS 110*b* may also receive the beamformed signal from UE 120 in one or more receive directions 182'. BS 110*b* and UE 120 may then perform beam training to determine the best receive and transmit directions for each of BS 110*b* and UE 120. Notably, the transmit and receive directions for BS 110*b* may or may not be the same. Similarly, the transmit and receive directions for UE 120 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 120 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 161, other MMEs 162, a Serving Gateway 163, a Multimedia Broadcast Multicast Service (MBMS) Gateway 164, a Broadcast Multicast Service Center (BM-SC) 165, and/or a Packet Data Network (PDN) Gateway 166, such as in the depicted example. MME 161 may be in communication with a Home Subscriber Server (HSS) 167. MME 161 is a control node that processes the signaling between the UEs 120 and the EPC 160. Generally, MME 161 provides bearer and connection management.

Generally, user Internet protocol (IP) packets are transferred through Serving Gateway 163, which is connected to PDN Gateway 166. PDN Gateway 166 provides UE IP address allocation as well as other functions. PDN Gateway 166 and the BM-SC 165 are connected to IP Services 168, which may include, for example, the Internet, an intranet, an IP Multimedia Subsystem (IMS), a Packet Switched (PS) streaming service, and/or other IP services.

BM-SC 165 may provide functions for MBMS user service provisioning and delivery. BM-SC 165 may serve as an entry point for content provider MBMS transmission, may be used to authorize and initiate MBMS Bearer Services within a public land mobile network (PLMN), and/or may be used to schedule MBMS transmissions. MBMS Gateway 164 may distribute MBMS traffic to the BSs 110 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 191, other AMFs 192, a Session Management Function (SMF) 193, and a User Plane Function (UPF) 194. AMF 191 may be in communication with Unified Data Management (UDM) 195.

AMF 191 is a control node that processes signaling between UEs 120 and 5GC 190. AMF 191 provides, for example, QoS flow and session management.

IP packets are transferred through UPF 194, which is connected to the IP Services 196, and which provides UE IP address allocation as well as other functions for 5GC 190. IP Services 196 may include, for example, the Internet, an intranet, an IMS, a PS streaming service, and/or other IP services.

In various aspects, a network entity or network node can be implemented as an aggregated base station, a disaggregated base station, a component of a base station, an integrated access and backhaul (IAB) node, a relay node, a sidelink node, a transmission reception point (TRP), or a combination thereof, to name a few examples.

As indicated above, FIG. 1 is provided as an example. Other examples may differ from what is described with regard to FIG. 1.

Figure 2:
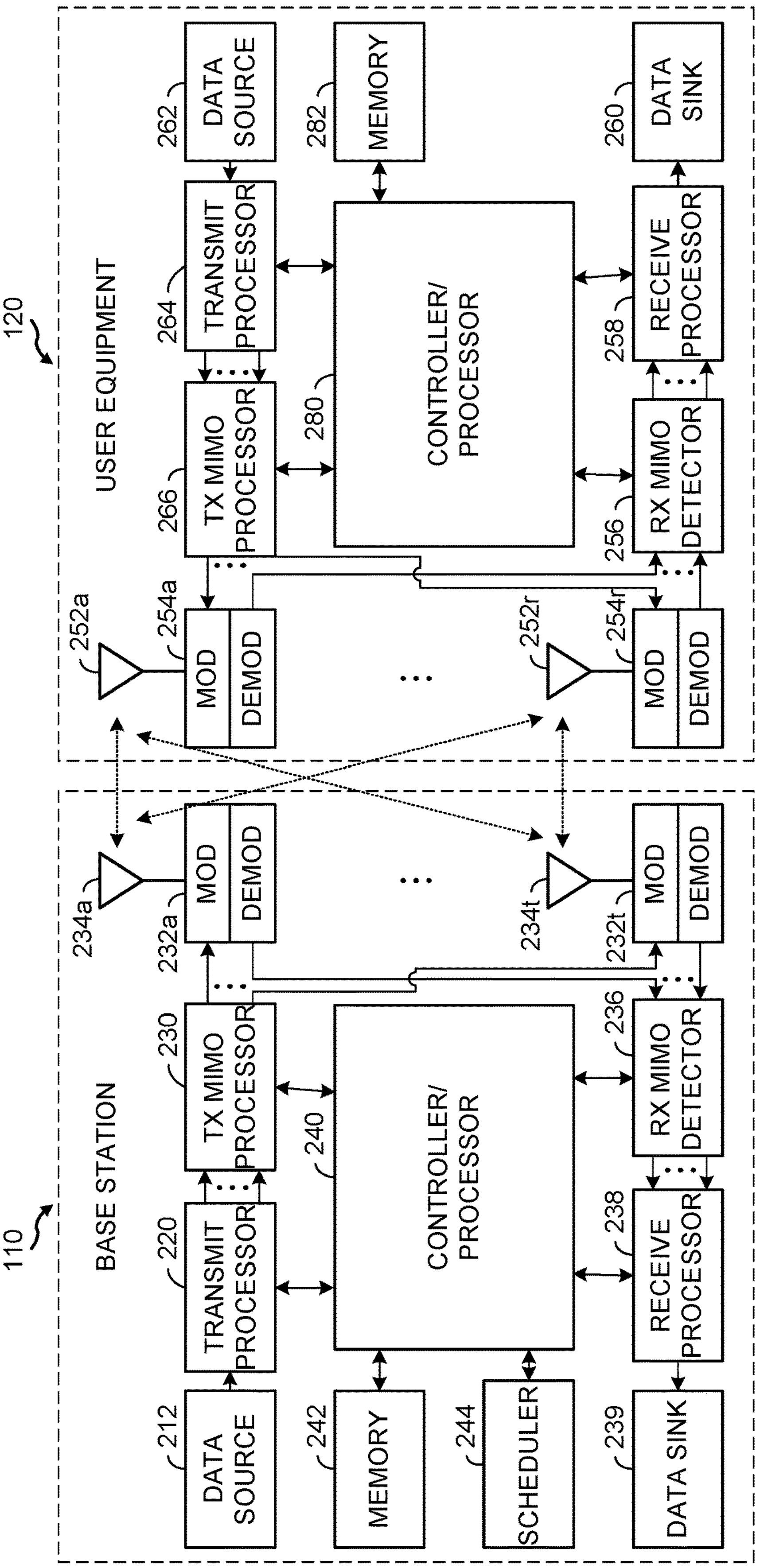
FIG. 2 depicts aspects of an example base station (BS) and user equipment (UE), in accordance with the present disclosure.

FIG. 2 depicts aspects of an example BS 110 and UE 120, in accordance with the present disclosure.

Generally, BS 110 includes various processors (e.g., 220, 230, 238, and 240), antennas 234*a-t* (collectively 234), transceivers 232*a-t* (collectively 232), which include modulators and demodulators, and other aspects, which enable wireless transmission of data (e.g., data source 212) and wireless reception of data (e.g., data sink 239). For example, BS 110 may send and receive data between BS 110 and UE 120. BS 110 includes controller/processor 240, which may be configured to implement various functions described herein related to wireless communications.

Generally, UE 120 includes various processors (e.g., 258, 264, 266, and 280), antennas 252*a-r* (collectively 252), transceivers 254*a-r* (collectively 254), which include modulators and demodulators, and other aspects, which enable wireless transmission of data (e.g., retrieved from data source 262) and wireless reception of data (e.g., provided to data sink 260). UE 120 includes controller/processor 280, which may be configured to implement various functions described herein related to wireless communications.

For an example downlink transmission, BS 110 includes a transmit processor 220 that may receive data from a data source 212 and control information from a controller/processor 240. The control information may be for the physical broadcast channel (PBCH), the physical control format indicator channel (PCFICH), the physical hybrid automatic repeat request (HARQ) indicator channel (PHICH), the physical downlink control channel (PDCCH), the group common PDCCH (GC PDCCH), and/or other channels. The data may be for the physical downlink shared channel (PDSCH), in some examples.

Transmit processor 220 may process (e.g., encode and symbol map) the data and control information to obtain data symbols and control symbols, respectively. Transmit processor 220 may also generate reference symbols, such as for the primary synchronization signal (PSS), the secondary synchronization signal (SSS), the PBCH demodulation reference signal (DMRS), or the channel state information reference signal (CSI-RS).

Transmit (TX) MIMO processor 230 may perform spatial processing (e.g., precoding) on the data symbols, the control symbols, and/or the reference symbols, if applicable, and may provide output symbol streams to the modulators (MODs) in transceivers 232*a*-232*t*. Each modulator in transceivers 232*a*-232*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 232*a*-232*t* may be transmitted via the antennas 234*a*-234*t*, respectively.

UE 120 includes antennas 252*a*-252*r* that may receive the downlink signals from the BS 110 and may provide received signals to the demodulators (DEMODs) in transceivers 254*a*-254*r*, respectively. Each demodulator in transceivers 254*a*-254*r* may condition (e.g., filter, amplify, downconvert, and digitize) a respective received signal to obtain input samples. Each demodulator may further process the input samples to obtain received symbols.

MIMO detector 256 may obtain received symbols from all the demodulators in transceivers 254*a*-254*r*, perform MIMO detection on the received symbols if applicable, and provide detected symbols. Receive processor 258 may process (e.g., demodulate, deinterleave, and decode) the detected symbols, provide decoded data for the UE 120 to a data sink 260, and provide decoded control information to a controller/processor 280.

For an example uplink transmission, UE 120 further includes a transmit processor 264 that may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254*a*-254*r* (e.g., for SC-FDM), and transmitted to BS 110.

At BS 110, the uplink signals from UE 120 may be received by antennas 234*a*-234*t*, processed by the demodulators in transceivers 232*a*-232*t*, detected by a MIMO detector 236 if applicable, and further processed by a receive processor 238 to obtain decoded data and control information sent by UE 120. Receive processor 238 may provide the decoded data to a data sink 239 and the decoded control information to the controller/processor 240. Memories 242 and 282 may store data and program codes (e.g., processor-executable instructions, computer-executable instructions) for BS 110 and UE 120, respectively. Scheduler 244 may schedule UEs for data transmission on the downlink and/or uplink.

In various aspects, BS 110 may be described as transmitting and receiving various types of data associated with the methods described herein. In these contexts, "transmitting" may refer to various mechanisms of outputting data, such as outputting data from data source 212, scheduler 244, memory 242, transmit processor 220, controller/processor 240, TX MIMO processor 230, transceivers 232*a-t*, antenna 234*a-t*, and/or other aspects described herein. Similarly, "receiving" may refer to various mechanisms of obtaining data, such as obtaining data from antennas 234*a-t*, transceivers 232*a-t*, receive (RX) MIMO detector 236, controller/processor 240, receive processor 238, scheduler 244, memory 242, a network interface, and/or other aspects described herein.

In various aspects, UE 120 may likewise be described as transmitting and receiving various types of data associated with the methods described herein. In these contexts, "transmitting" may refer to various mechanisms of outputting data, such as outputting data from data source 262, memory 282, transmit processor 264, controller/processor 280, TX MIMO processor 266, transceivers 254*a-t*, antenna 252*a-t*, and/or other aspects described herein. Similarly, "receiving" may refer to various mechanisms of obtaining data, such as obtaining data from antennas 252*a-t*, transceivers 254*a-t*, RX MIMO detector 256, controller/processor 280, receive processor 258, memory 282, and/or other aspects described herein.

In some aspects, a processor may be configured to perform various operations, such as those associated with the methods described herein, and transmit (output) data to or receive (obtain) data from another interface that is configured to transmit or receive, respectively, the data.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an JAB network, an O-RAN (such as the network configuration sponsored by the O-RAN Alliance), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

FIG. 3 depicts an example disaggregated base station 300 architecture. The disaggregated base station 300 architecture may include one or more CUs 310 that can communicate directly with a core network 320 via a backhaul link, or indirectly with the core network 320 through one or more disaggregated base station units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340, as well as the Near-RT RICs 325, the Non-RT RICs 315 and the SMO Framework 305) may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally, or alternatively, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by 3GPP. In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over-the-air (OTA) communications with one or more UEs 120. In some implementations, real-time and non-real-time aspects of control and user plane communications with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, artificial intelligence/machine learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figures 4A, 4B, 4C, 4D:
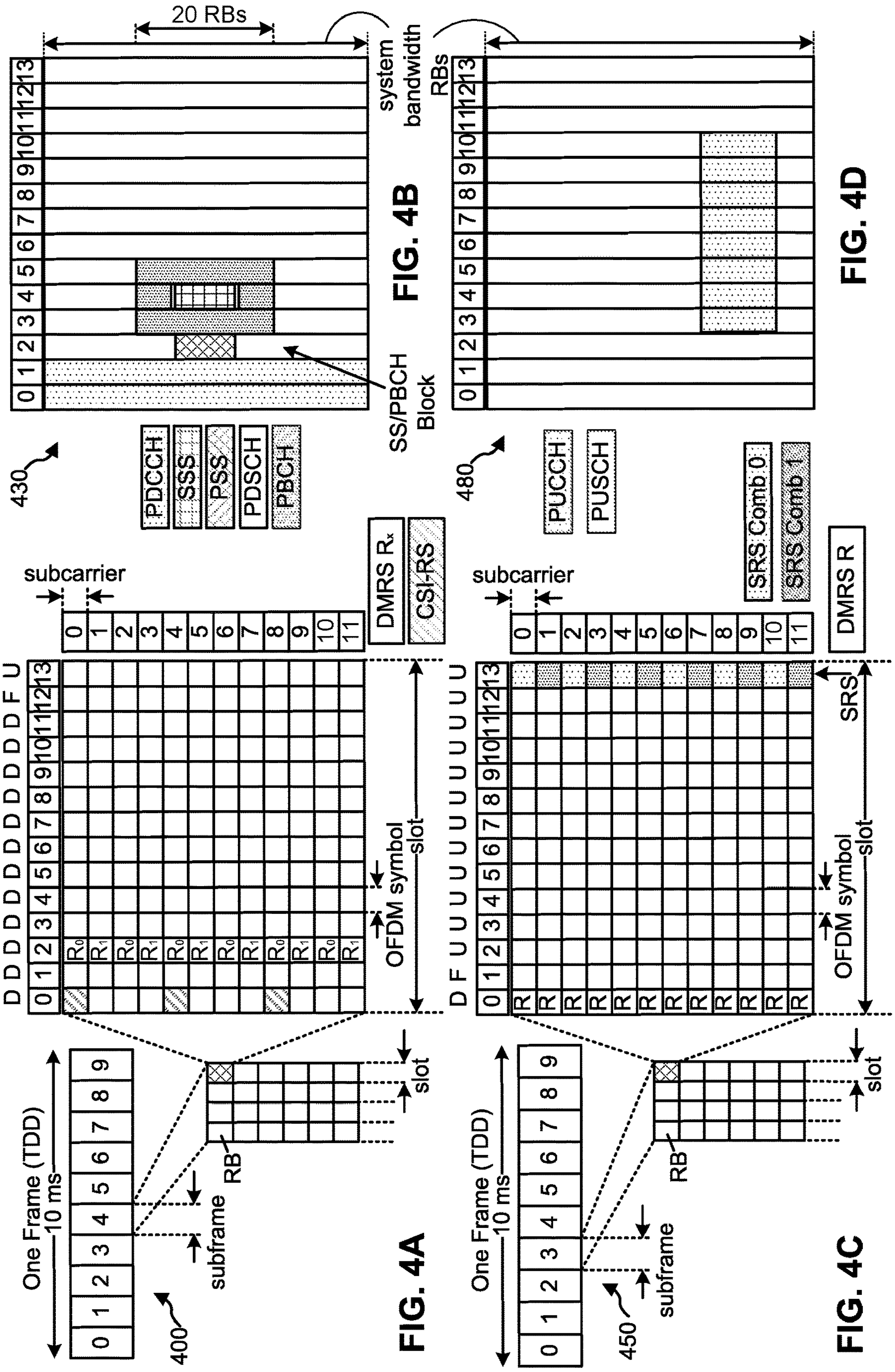
FIGS. 4A, 4B, 4C, and 4D depict aspects of data structures for a wireless communications network in accordance with the present disclosure.

FIGS. 4A, 4B, 4C, and 4D depict aspects of data structures for a wireless communications network, such as wireless communications network 100 of FIG. 1, in accordance with the present disclosure. FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex, in which, for a particular set of subcarriers, subframes within the set of subcarriers are dedicated for both DL and UL.

In FIGS. 4A and 4C, the wireless communications frame structure is TDD where D is DL, U is UL, and F is flexible for use between DL/UL. UEs may be configured with a slot format through a received slot format indicator (SFI) (dynamically through DL control information (DCI), or semi-statically/statically through RRC signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology p, there are 14 symbols/slot and $2^{\mu}$ slots/subframe. The subcarrier spacing and symbol length/duration are a function of the numerology. The subcarrier spacing may be equal to $2^{\mu}\times 15$ kHz, where is the numerology index, which may be selected from values 0 to 5. Accordingly, the numerology μ=0 has a subcarrier spacing of 15 kHz and the numerology μ=5 has a subcarrier spacing of 480 kHz. Other numerologies and subcarrier spacings may be used. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RSs) for a UE (e.g., UE 120). The RSs may include DMRSs and/or CSI-RSs for channel estimation at the UE. The RSs may also include beam measurement RSs (BRSs), beam refinement RSs (BRRSs), and/or phase tracking RSs (PT-RSs).

FIG. 4B illustrates an example of various DL channels within a subframe of a frame. The PDCCH carries DCI within one or more control channel elements (CCEs), each CCE including, for example, nine RE groups (REGs), each REG including, for example, four consecutive REs in an OFDM symbol.

A PSS may be within symbol 2 of particular subframes of a frame. The PSS is used by a UE (e.g., UE 120) to determine subframe/symbol timing and a physical layer identity.

An SSS may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRSs. The PBCH, which carries a master information block (MIB), may be logically grouped with the PSS and SSS to form a synchronization signal (SS)/PBCH block (SSB). The MIB provides a number of RBs in the system bandwidth and a system frame number (SFN). The PDSCH carries user data, broadcast system information not transmitted through the PBCH such as system information blocks (SIBs), and/or paging messages.

As illustrated in FIG. 4C, some of the REs carry DMRSs (indicated as R for one particular configuration, but other DMRS configurations are possible) for channel estimation at the base station. The UE may transmit DMRSs for the PUCCH and DMRSs for the PUSCH. The PUSCH DMRSs may be transmitted, for example, in the first one or two symbols of the PUSCH. The PUCCH DMRSs may be transmitted in different configurations depending on whether short or long PUCCHs are transmitted and depending on the particular PUCCH format used. UE 120 may transmit SRSs. The SRSs may be transmitted, for example, in the last symbol of a subframe. The SRSs may have a comb structure, and a UE may transmit SRSs on one of the combs. The SRSs may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ acknowledgement or negative acknowledgement (ACK/NACK) feedback. The PUSCH carries data, and may additionally be used to carry a buffer status report (BSR), a power headroom report (PHR), and/or UCI.

Figure 5:
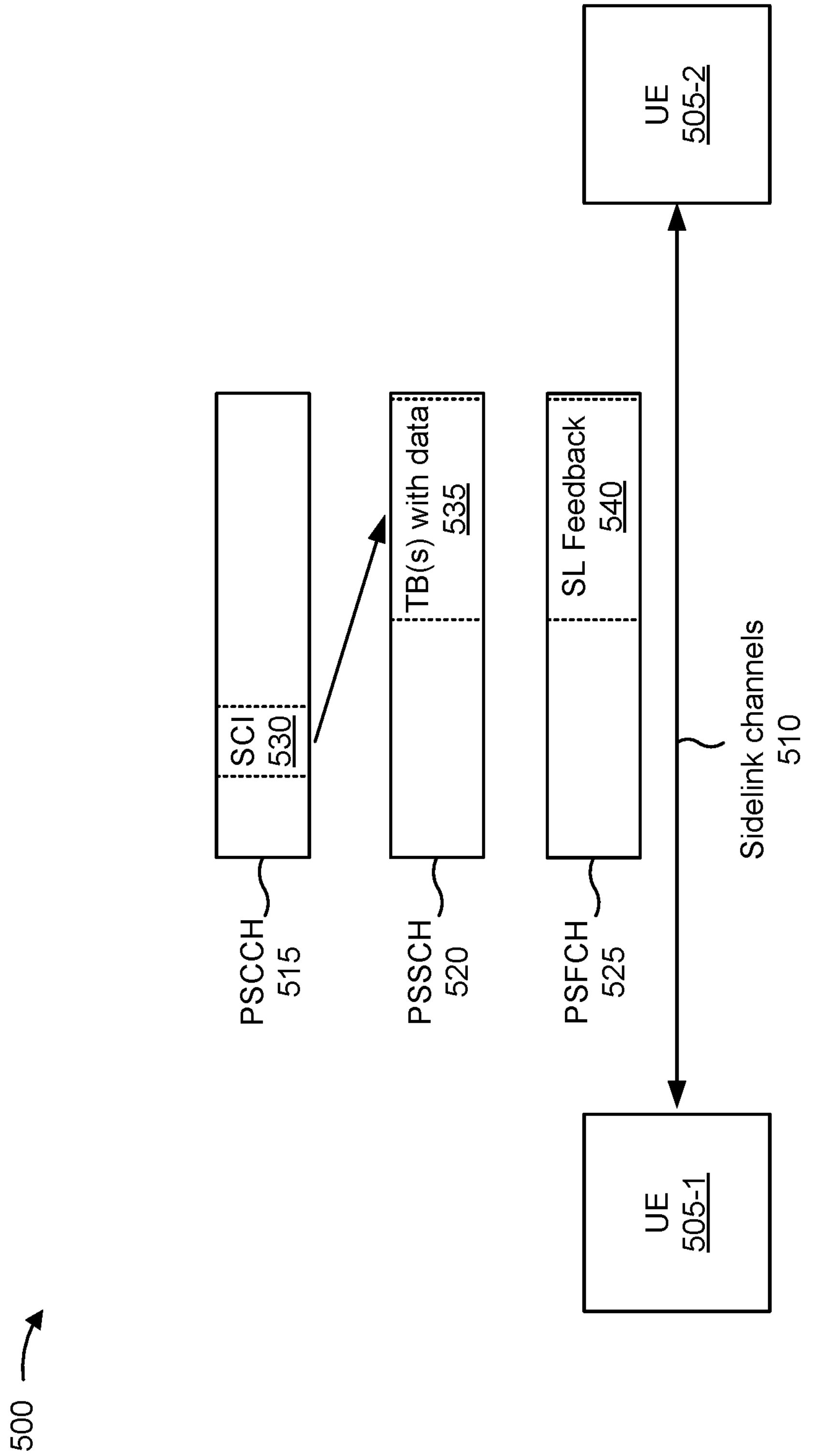
FIG. 5 is a diagram illustrating an example of sidelink communications, in accordance with the present disclosure.

FIG. 5 is a diagram illustrating an example 500 of sidelink communications, in accordance with the present disclosure.

As shown in FIG. 5, a first UE 505-1 may communicate with a second UE 505-2 (and one or more other UEs 505) via one or more sidelink channels 510. The UEs 505-1 and 505-2 may communicate using the one or more sidelink channels 510 for peer-to-peer (P2P) communications, D2D communications, vehicle-to-everything (V2X) communications (e.g., which may include vehicle-to-vehicle (V2V) communications, vehicle-to-infrastructure (V2I) communications, and/or vehicle-to-pedestrian (V2P) communications) and/or mesh networking. In some aspects, the UEs 505 (e.g., UE 505-1 and/or UE 505-2) may correspond to one or more other UEs described elsewhere herein, such as UE 120. In some aspects, the one or more sidelink channels 510 may use a PC5 interface and/or may operate in a high frequency band (e.g., the 5.9 GHz band). Additionally, or alternatively, the UEs 505 may synchronize timing of transmission time intervals (TTIs) (e.g., frames, subframes, slots, or symbols) using global navigation satellite system (GNSS) timing.

As further shown in FIG. 5, the one or more sidelink channels 510 may include a PSCCH 515, a PSSCH 520, and/or a PSFCH 525. The PSCCH 515 may be used to communicate control information, similar to a PDCCH and/or a physical uplink control channel (PUCCH) used for cellular communications with a base station 110 via an access link or an access channel. The PSSCH 520 may be used to communicate data, similar to a PDSCH and/or a PUSCH used for cellular communications with a base station 110 via an access link or an access channel. For example, the PSCCH 515 may carry sidelink control information (SCI) 530, which may indicate various control information used for sidelink communications, such as one or more resources (e.g., time resources, frequency resources, and/or spatial resources) where a transport block (TB) 535 may be carried on the PSSCH 520. The TB 535 may include data. The PSFCH 525 may be used to communicate sidelink feedback 540, such as HARQ feedback (e.g., ACK/NACK information), transmit power control (TPC), and/or a scheduling request (SR).

Although shown on the PSCCH 515, in some aspects, the SCI 530 may include multiple communications in different stages, such as a first stage SCI (SCI-1) and a second stage SCI (SCI-2). The SCI-1 may be transmitted on the PSCCH 515. The SCI-2 may be transmitted on the PSSCH 520. The SCI-1 may include, for example, an indication of one or more resources (e.g., time resources, frequency resources, and/or spatial resources) on the PSSCH 520, information for decoding sidelink communications on the PSSCH, a QoS priority value, a resource reservation period, a PSSCH DMRS pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 520, such as a HARQ process ID, a new data indicator (NDI), a source identifier, a destination identifier, and/or a channel state information (CSI) report trigger.

In some aspects, the one or more sidelink channels 510 may use resource pools. For example, a scheduling assignment (e.g., included in SCI 530) may be transmitted in sub-channels using specific RBs across time. In some aspects, data transmissions (e.g., on the PSSCH 520) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 505 may operate using a sidelink transmission mode (e.g., Mode 1) where resource selection and/or scheduling is performed by a base station 110 (e.g., a base station, a CU, or a DU). For example, the UE 505 may receive a grant (e.g., in DCI or in an RRC message, such as for configured grants) from the base station 110 (e.g., directly or via one or more network nodes) for sidelink channel access and/or scheduling. In some aspects, a UE 505 may operate using a transmission mode (e.g., Mode 2) where resource selection and/or scheduling is performed by the UE 505 (e.g., rather than a base station 110). In some aspects, the UE 505 may perform resource selection and/or scheduling by sensing channel availability for transmissions. For example, the UE 505 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 505 may perform resource selection and/or scheduling using SCI 530 received in the PSCCH 515, which may indicate occupied resources and/or channel parameters. Additionally, or alternatively, the UE 505 may perform resource selection and/or scheduling by determining a channel busy ratio (CBR) associated with various sidelink channels, which may be used for rate control (e.g., by indicating a maximum number of resource blocks that the UE 505 can use for a particular set of subframes).

In the transmission mode where resource selection and/or scheduling is performed by a UE 505, the UE 505 may generate sidelink grants, and may transmit the grants in SCI 530. A sidelink grant may indicate, for example, one or more parameters (e.g., transmission parameters) to be used for an upcoming sidelink transmission, such as one or more resource blocks to be used for the upcoming sidelink transmission on the PSSCH 520 (e.g., for TBs 535), one or more subframes to be used for the upcoming sidelink transmission, and/or an MCS to be used for the upcoming sidelink transmission. In some aspects, a UE 505 may generate a sidelink grant that indicates one or more parameters for semi-persistent scheduling (SPS), such as a periodicity of a sidelink transmission. Additionally, or alternatively, the UE 505 may generate a sidelink grant for event-driven scheduling, such as for an on-demand sidelink message.

As indicated above, FIG. 5 is provided as an example. Other examples may differ from what is described with respect to FIG. 5.

Figure 6:
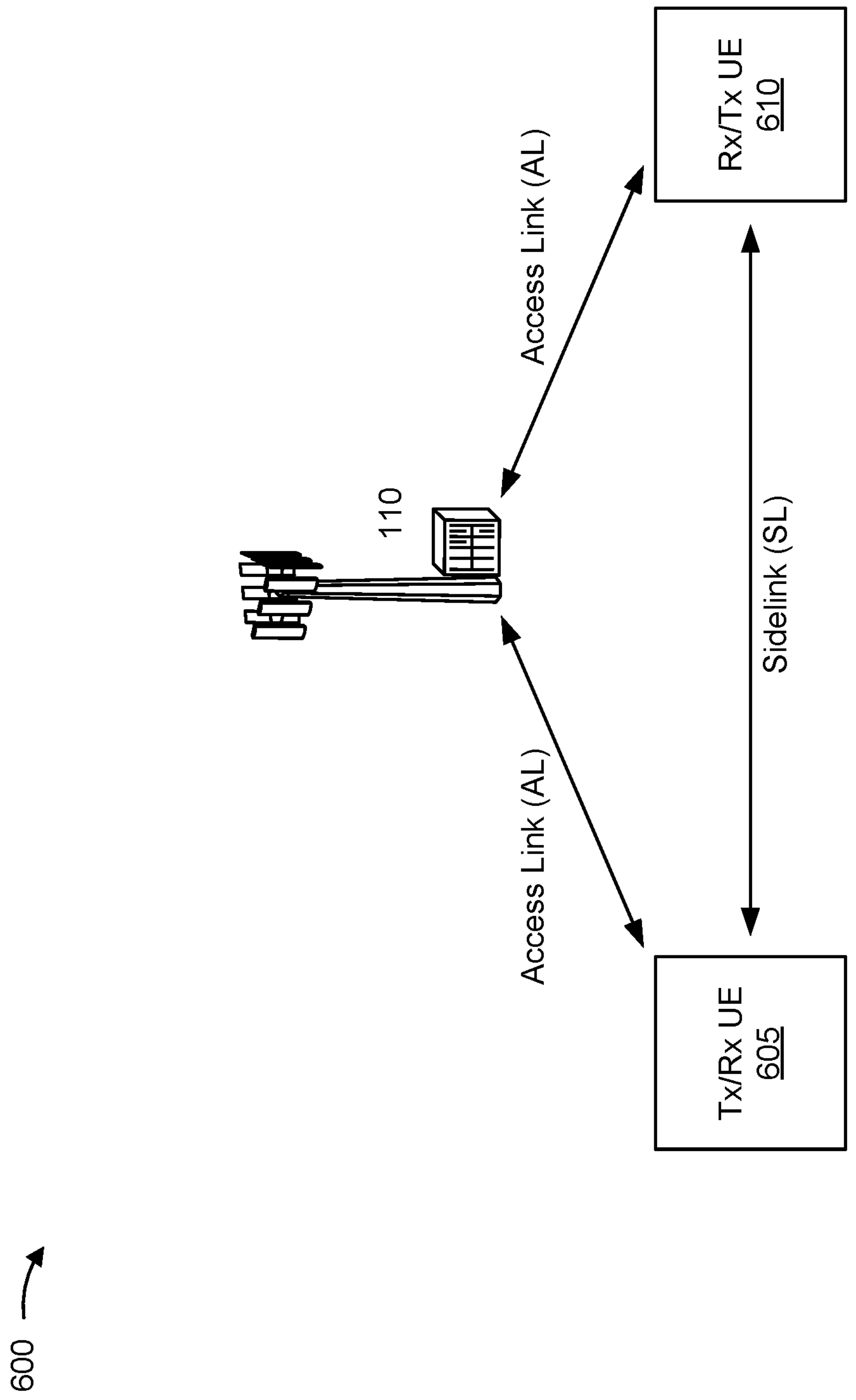
FIG. 6 is a diagram illustrating an example of sidelink communications and access link communications, in accordance with the present disclosure.

FIG. 6 is a diagram illustrating an example 600 of sidelink communications and access link communications, in accordance with the present disclosure.

As shown in FIG. 6, a transmitter (Tx)/receiver (Rx) UE 605 and an Rx/Tx UE 610 may communicate with one another via a sidelink, as described above in connection with FIG. 5. As further shown, in some sidelink modes, a base station 110 may communicate with the Tx/Rx UE 605 (e.g., directly or via one or more network nodes), such as via a first access link. Additionally, or alternatively, in some sidelink modes, the base station 110 may communicate with the Rx/Tx UE 610 (e.g., directly or via one or more network nodes), such as via a first access link. The Tx/Rx UE 605 and/or the Rx/Tx UE 610 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 6 is provided as an example. Other examples may differ from what is described with respect to FIG. 6.

Figure 7:
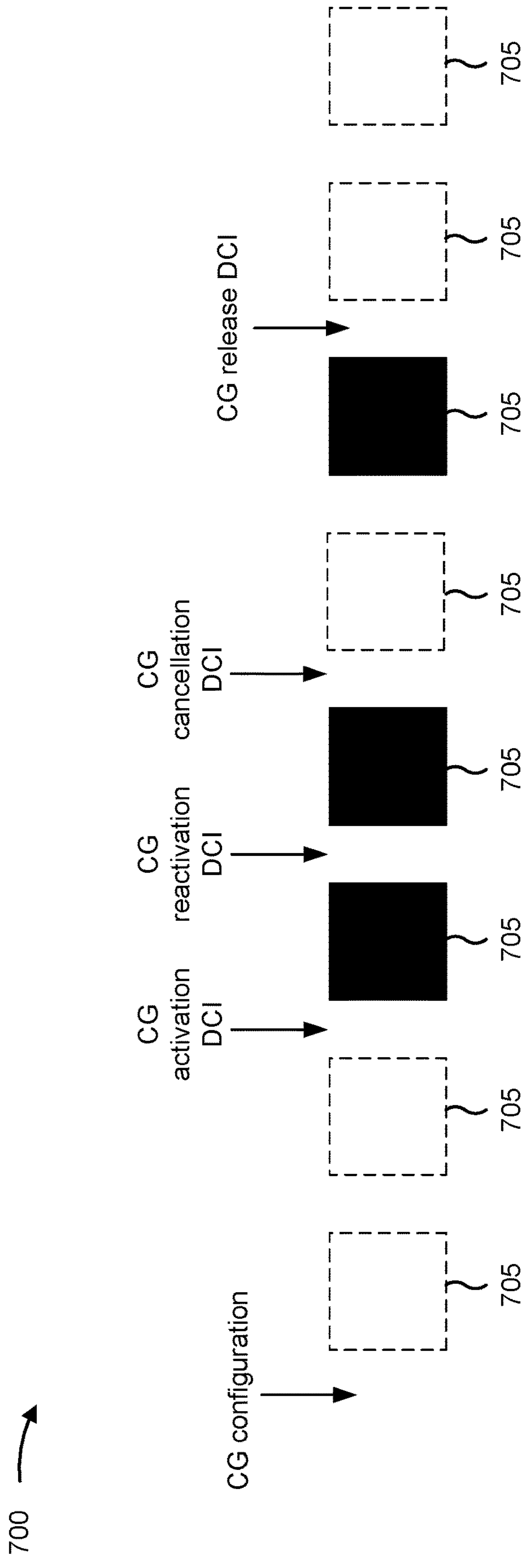
FIG. 7 is a diagram illustrating an example of uplink configured grant (CG) communication, in accordance with the present disclosure.

FIG. 7 is a diagram illustrating an example 700 of configured grant (CG) communication, in accordance with the present disclosure. CG communications may include periodic uplink or sidelink communications that are configured for a UE, such that the base station does not need to send separate DCI to schedule each uplink communication, or the UE does not need to engage in separate sidelink signaling for each sidelink communication, thereby conserving signaling overhead.

As shown in example 700, a UE may be configured with a CG configuration for CG communications. For example, the UE may receive the CG configuration via an RRC message transmitted by a base station. The CG configuration may indicate a resource allocation associated with CG communications (e.g., in a time domain, frequency domain, spatial domain, and/or code domain) and a periodicity at which the resource allocation is repeated, resulting in periodically reoccurring scheduled CG occasions 705 for the UE. In some examples, the CG configuration may identify a resource pool or multiple resource pools that are available to the UE for a transmission. The CG configuration may configure contention-free CG communications (e.g., where resources are dedicated for the UE to transmit communications) or contention-based CG communications (e.g., where the UE contends for access to a channel in the configured resource allocation, such as by using a channel access procedure or a channel sensing procedure).

The base station may transmit CG activation DCI to the UE to activate the CG configuration for the UE. The base station may indicate, in the CG activation DCI, communication parameters, such as an MCS, an RB allocation, and/or antenna ports, for the CG PUSCH or PSSCH communications to be transmitted in the scheduled CG occasions 705. The UE may begin transmitting in the CG occasions 705 based at least in part on receiving the CG activation DCI. For example, beginning with a next scheduled CG occasion 705 subsequent to receiving the CG activation DCI, the UE may transmit a communication in the scheduled CG occasions 705 using the communication parameters indicated in the CG activation DCI. The UE may refrain from transmitting in configured CG occasions 705 prior to receiving the CG activation DCI.

The base station may transmit CG reactivation DCI to the UE to change the communication parameters for the CG communications. Based at least in part on receiving the CG reactivation DCI, and the UE may begin transmitting in the scheduled CG occasions 705 using the communication parameters indicated in the CG reactivation DCI. For example, beginning with a next scheduled CG occasion 705 subsequent to receiving the CG reactivation DCI, the UE may transmit communications in the scheduled CG occasions 705 based at least in part on the communication parameters indicated in the CG reactivation DCI.

In some cases, such as when the base station needs to override a scheduled CG communication for a higher priority communication, the base station may transmit CG cancellation DCI to the UE to temporarily cancel or deactivate one or more subsequent CG occasions 705 for the UE. The CG cancellation DCI may deactivate only a subsequent one CG occasion 705 or a subsequent N CG occasions 705 (where N is an integer). CG occasions 705 after the one or more (e.g., N) CG occasions 705 subsequent to the CG cancellation DCI may remain activated. Based at least in part on receiving the CG cancellation DCI, the UE may refrain from transmitting in the one or more (e.g., N) CG occasions 705 subsequent to receiving the CG cancellation DCI. As shown in example 700, the CG cancellation DCI cancels one subsequent CG occasion 705 for the UE. After the CG occasion 705 (or N CG occasions) subsequent to receiving the CG cancellation DCI, the UE may automatically resume transmission in the scheduled CG occasions 705.

The base station may transmit CG release DCI to the UE to deactivate the CG configuration for the UE. The UE may stop transmitting in the scheduled CG occasions 705 based at least in part on receiving the CG release DCI. For example, the UE may refrain from transmitting in any scheduled CG occasions 705 until another CG activation DCI is received from the base station. Whereas the CG cancellation DCI may deactivate only a subsequent one CG occasion 705 or a subsequent N CG occasions 705, the CG release DCI deactivates all subsequent CG occasions 705 for a given CG configuration for the UE until the given CG configuration is activated again by a new CG activation DCI.

As indicated above, FIG. 7 is provided as an example. Other examples may differ from what is described with respect to FIG. 7.

Figure 8:
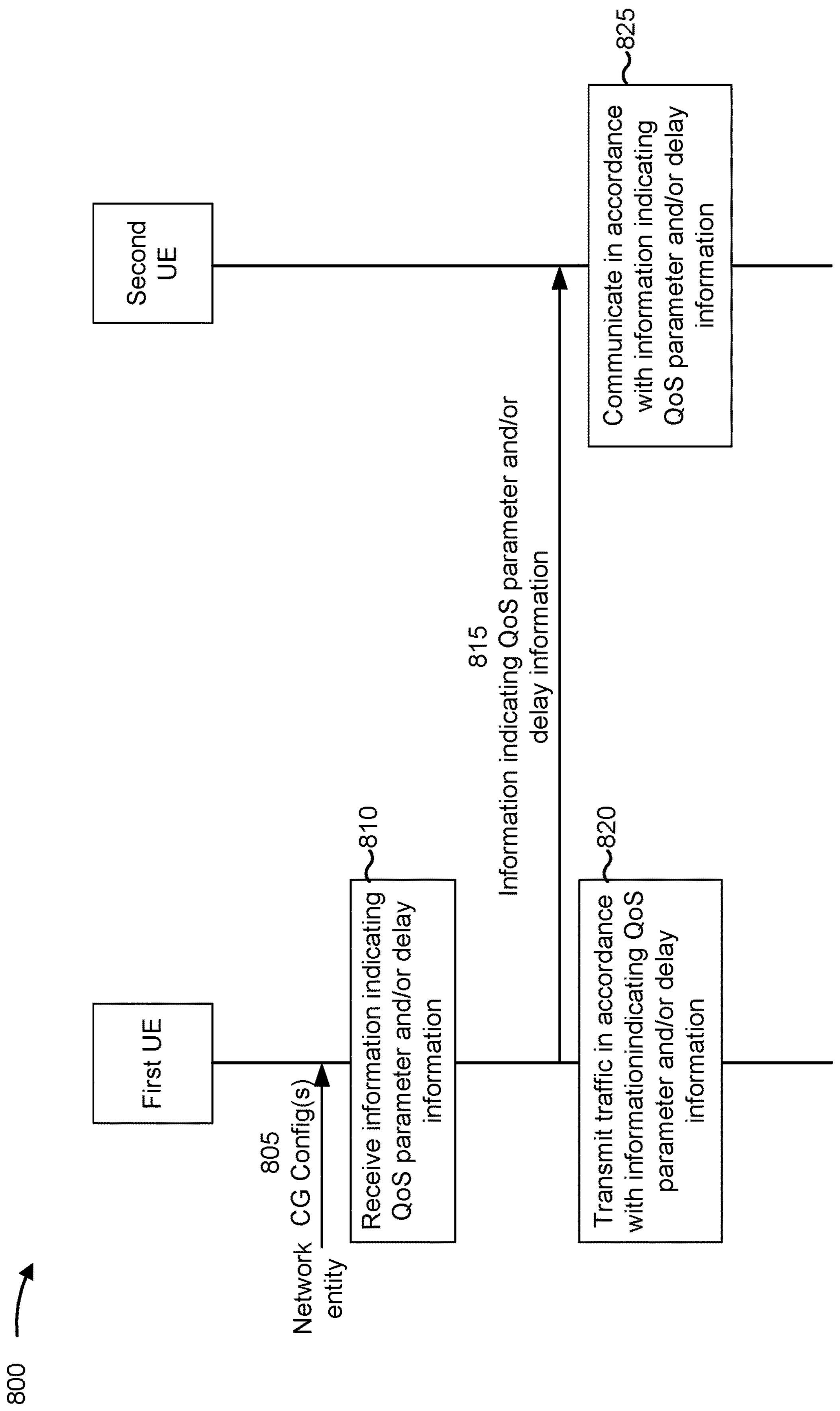
FIG. 8 is a diagram illustrating an example associated with configuration based on traffic priority and quality-of-service awareness between UEs, in accordance with the present disclosure.

FIG. 8 is a diagram illustrating an example 800 associated with configuration based on traffic priority and quality-of-service awareness between UEs, in accordance with the present disclosure. Example 800 includes a first UE (e.g., UE 120, UE 505, UE 605) and a second UE (e.g., UE 120, UE 505, UE 605). In example 800, the first UE may be referred to as a transmitter UE (Tx UE) and the second UE may be referred to as a receiver UE (Rx UE).

As shown by reference number 805, the first UE may receive, from a network entity, a CG configuration (e.g., the CG configuration, CG activation DCI, or CG reactivation DCI of FIG. 7). In some aspects, the CG configuration may indicate a QoS parameter for traffic of the first UE. The QoS parameter may indicate, for example, whether traffic has a guaranteed bit rate, a minimum bit rate, a packet loss rate, a delay critical resource type, a QoS flow identifier, a notification control parameter, a packet error rate, an averaging window, a maximum data burst volume, or a combination thereof. In some aspects, the CG configuration may indicate a physical layer priority of the traffic. In some aspects, the CG configuration may indicate a higher-layer priority (e.g., a Layer 2 priority) of the traffic. The CG configuration may indicate a set of CG occasions (e.g., CG occasions 705) on which traffic can be transmitted by the first UE. For example, the set of CG occasions may be for transmission of traffic on the uplink (e.g., to a network entity) or for transmission of traffic on the sidelink (e.g., to the second UE). In some aspects, the first UE may receive multiple CG configurations.

In some aspects, as shown by reference number 810, the first UE may receive information indicating a QoS parameter, a priority parameter, and/or delay information (e.g., a PDB, a remaining PDB) associated with traffic of the first UE. The QoS parameter may be associated with the traffic because the QoS parameter indicates a QoS requirement or other information relating to QoS for transmission or reception of the traffic. The delay information may be associated with the traffic because the delay information indicates a PDB of the traffic. The priority parameter (such as a Layer 1 priority level or a Layer 2 priority level) may be associated with the traffic because the priority parameter indicates a priority level for the traffic relative to other traffic. The traffic may be for transmission on the uplink or on the sidelink (e.g., to the second UE). In some aspects, at least part of the information shown by reference number 810 may be received in the CG configuration. In some aspects, the QoS parameter, the priority parameter, and/or the delay information may be indicated by a logical channel group (LCG) associated with the traffic, such as a priority parameter of a radio bearer to which the LCG is mapped or a priority parameter of the LCG or a logical channel of the LCG. In some aspects, the traffic may include URLLC traffic (e.g., traffic having a threshold latency requirement and/or a threshold reliability requirement, such as 1e-6 BLER and/or a maximum of 1 ms latency). In some aspects, the traffic may be associated with a particular application such as an XR application. In some aspects, the information shown by reference number 810 may be included in a QoS flow configuration.

As shown by reference number 815, the first UE may transmit, to the second UE or a controller, information indicating the QoS parameter, the priority parameter, and/or the delay information of the traffic. For example, the first UE may transmit information indicating the QoS parameter. In some aspects, the first UE may transmit information indicating the delay information. In some aspects, the first UE may transmit information indicating the priority parameter. For example, the first UE may transmit information indicating a remaining PDB of the traffic. In some aspects, the information shown by reference number 815 may indicate QoS parameters, priority parameters, and/or delay information of multiple traffic transmissions and/or LCGs. For example, the information may indicate respective QoS parameters, priority parameters, and/or delay information for a number of data transmissions and/or LCGs (e.g., K data transmissions and/or LCGs, where K is at least 1). In some aspects, the number of data transmissions and/or LCGs may be the highest-priority data transmission(s) and/or LCG(s) of the first UE. For example, the information may relate to a K highest-priority data transmissions and/or LCGs.

In some aspects, the first UE may transmit the information shown by reference number 815 to multiple UEs. For example, the first UE may transmit this information to a set of UEs that each have an RRC connection (e.g., a sidelink connection) with the first UE. As another example, the first UE may transmit this information via a groupcast transmission (e.g., directed to a set of UEs associated with a particular group identifier). As another example, the first UE may transmit this information via a broadcast transmission (e.g., to all UEs within a range of the first UE). As another example, the first UE may transmit this information to a controller. The controller may include for example, a programmable logic controller (PLC) or a UE controlling the first UE and/or the second UE. In some aspects, the second UE may receive this information from a controller (e.g., a controller to which the information was provided by the first UE).

In some aspects, the information shown by reference number 815 may identify a CG configuration. For example, the UE may transmit information indicating a CG configuration and a QoS parameter, priority parameter, and/or delay information of traffic to be transmitted on CG occasions of the CG configuration. As another example, the UE may transmit information indicating multiple CG configurations, as well as a respective QoS parameter, respective priority parameter, and/or respective delay information of traffic to be transmitted on respective CG occasions of the multiple CG configurations. Thus, the second UE (and any other recipient UEs or controllers) can identify the priority or importance of traffic on each CG of the first UE, such that the second UE can configure or prioritize transmissions based at least in part on the priority or importance of such traffic.

In some aspects, the first UE may transmit the information shown by reference number 815 using Layer 1 (physical layer) signaling (e.g., a sidelink wakeup signal or sidelink control information), Layer 2 (MAC layer) signaling (e.g., a sidelink MAC control element), Layer 3 (RRC layer) signaling (e.g., RRC signaling), a PSSCH, or the like. In some aspects, the information shown by reference number 815 may be multiplexed with or piggybacked on (e.g., carried by) another transmission that uses Layer 1 signaling, Layer 2 signaling, or Layer 3 signaling. In some aspects, the first UE may transmit this information periodically (e.g., every T seconds).

In some aspects, the information shown by reference number 815 indicates one or more time intervals in which the traffic is expected. For example, the one or more time intervals may include one or more CG occasions. As another example, the one or more time intervals may include one or more sidelink time resources. As another example, the one or more time intervals may include one or more uplink time resources. In some aspects, the information shown by reference number 815 may include a bitmap. The bitmap may indicate the one or more time intervals. Each bit of the bitmap may correspond to a time interval (e.g., a number of slots, a number of time units), where the size of the time interval that corresponds to a bit can be configured (e.g., by the network entity) or preconfigured (e.g., by a wireless communication specification, an original equipment manufacturer, a network operator, or the like).

As shown by reference number 820, the first UE may transmit the traffic in accordance with the information (e.g., the information indicating the QoS parameter, priority parameter, and/or the delay information). For example, the first UE may transmit the traffic on a resource (e.g., in a time interval) indicated by the information. As another example, the first UE may transmit the traffic using a CG occasion indicated by the information. As another example, the first UE may transmit the traffic within the PDB of the traffic. The traffic may be sidelink traffic or uplink traffic.

As shown by reference number 825, the second UE may communicate in accordance with the information (e.g., the information indicating the QoS parameter, priority parameter, and/or the delay information). For example, the second UE may receive the traffic from the first UE on the sidelink. As another example, the second UE may transmit a communication on an uplink in accordance with the information. For example, the information may indicate one or more time intervals in which the traffic is expected, and the second UE may transmit a communication in a time interval other than the one or more time intervals (e.g., the second UE may select a resource that does not overlap with the one or more time intervals). As another example, the second UE may avoid using resources of the traffic (indicated by the information) if a remaining PDB of the information is lower than a threshold. In some aspects, the second UE may cancel a transmission based at least in part on the transmission overlapping with the traffic.

In some aspects, the second UE may transmit a communication using a transmission configuration based at least in part on the communication overlapping with the traffic. For example, the second UE may select a resource (e.g., a sidelink resource or an uplink resource), indicated by the information shown by reference number 815, for transmission of the communication. Because the selected resource overlaps with a resource on which the traffic is transmitted, and based at least in part on the QoS parameter, the priority parameter, or the delay information, the second UE may use a transmission configuration for transmission of the communication. The transmission may indicate at least one of an MCS (e.g., the second UE may use a lower MCS for communications overlapping the traffic than for communications that do not overlap the traffic), a power control parameter (e.g., the second UE may use a lower transmit power for communications overlapping the traffic than communications that do not overlap the traffic), or the like. In some aspects, the transmission configuration may indicate a modification of a resource allocation for the second UE's communication based at least in part on the communication overlapping with the traffic. For example, the transmission configuration may indicate that the second UE is to use a reduced number of resources for transmission of the communication, such as by skipping a portion of the number of resources.

In some aspects, the second UE may select a resource (e.g., a sidelink resource or an uplink resource) for a communication of the second UE. For example, the second UE may avoid selecting a resource indicated as a resource on which the traffic is to be transmitted. In some aspects, the second UE may avoid selecting the resource based at least in part on a type of communication of the second UE. For example, the second UE may avoid selecting the resource if the communication is a grant-free communication (e.g., a non-orthogonal multiple access (NOMA) communication) or a multi-user MIMO (MU-MIMO) communication.

In some aspects, the first UE or the second UE may adjust a selected resource such that the selected resource does not overlap with the traffic, or minimizes overlap with the traffic. For example, a UE (e.g., the first UE or the second UE) may be configured with multiple resources on which the UE can perform a transmission (e.g., the traffic or a transmission of the second UE). In some aspects, the UE may be configured with multiple CGs. The UE may select a resource from the multiple CGs, or may select part of a CG resource, such that the selected resource (or part of the resource) does not overlap with another communication. In some aspects, the second UE may perform this resource selected randomly. In some aspects, the second UE may perform this resource selection in accordance with a deterministic procedure. In some aspects, the second UE may perform this resource selection based at least in part on a scrambling identifier configured for the second UE. In some aspects, the second UE may perform this resource selection based at least in part on at least one of a source identifier of the transmission, a destination identifier of the communication, a QoS parameter of the communication (e.g., indicated by the information shown by reference number 810), the priority parameter, the delay information (e.g., indicated by the information shown by reference number 810), or a combination thereof. In some aspects, the second UE may transmit, to the first UE, an indication of a first resource selected by the second UE such that the first UE can avoid selecting a second resource that overlaps with the first resource. In some aspects, the first UE and the second UE may each select a different subset of a resource (such as a CG occasion). For example, the first UE and the second UE may select subsets that do not overlap in frequency or in time. As another example, the first UE and the second UE may select subsets that do not overlap in time.

As indicated above, FIG. 8 is provided as an example. Other examples may differ from what is described with regard to FIG. 8.

Figure 9:
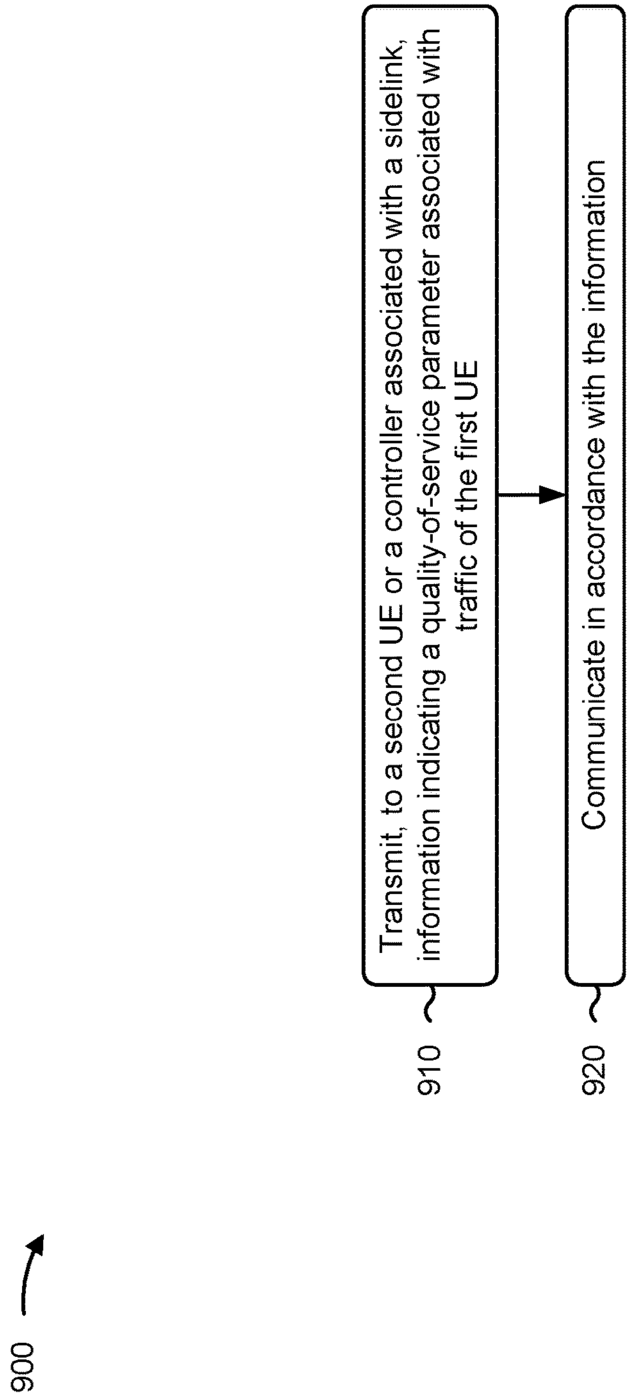
FIG. 9 shows a method for wireless communications by a first UE.

FIG. 9 shows a method 900 for wireless communications by a first UE (e.g. the first UE of FIG. 8), such as UE 120.

Method 900 begins at 910 with transmitting, to a second UE or a controller associated with a sidelink, information indicating a quality-of-service parameter associated with traffic of the first UE.

Method 900 then proceeds to step 920 with communicating in accordance with the information.

In a first aspect, the information indicates delay information for the traffic or a priority parameter for the traffic.

In a second aspect, alone or in combination with the first aspect, transmitting the information comprises transmitting the information to a set of UEs or a set of controllers having a radio resource control connection with the first UE.

In a third aspect, alone or in combination with one or more of the first and second aspects, transmitting the information comprises transmitting the information via a groupcast transmission or a broadcast transmission.

In a fourth aspect, alone or in combination with one or more of the first through third aspects, the information indicates the quality-of-service parameter or a priority parameter of a logical channel group of the traffic.

In a fifth aspect, alone or in combination with one or more of the first through fourth aspects, transmitting the information comprises transmitting the information in accordance with a periodicity.

In a sixth aspect, alone or in combination with one or more of the first through fifth aspects, transmitting the information comprises transmitting the information via one of physical layer signaling, medium access control layer signaling, or radio resource control layer signaling.

In a seventh aspect, alone or in combination with one or more of the first through sixth aspects, the information indicates one or more time intervals in which the traffic is expected.

In an eighth aspect, alone or in combination with one or more of the first through seventh aspects, the information indicates a configured grant for the traffic.

In a ninth aspect, alone or in combination with one or more of the first through eighth aspects, the traffic is sidelink traffic.

In a tenth aspect, alone or in combination with one or more of the first through ninth aspects, the traffic is uplink traffic.

Figure 11:
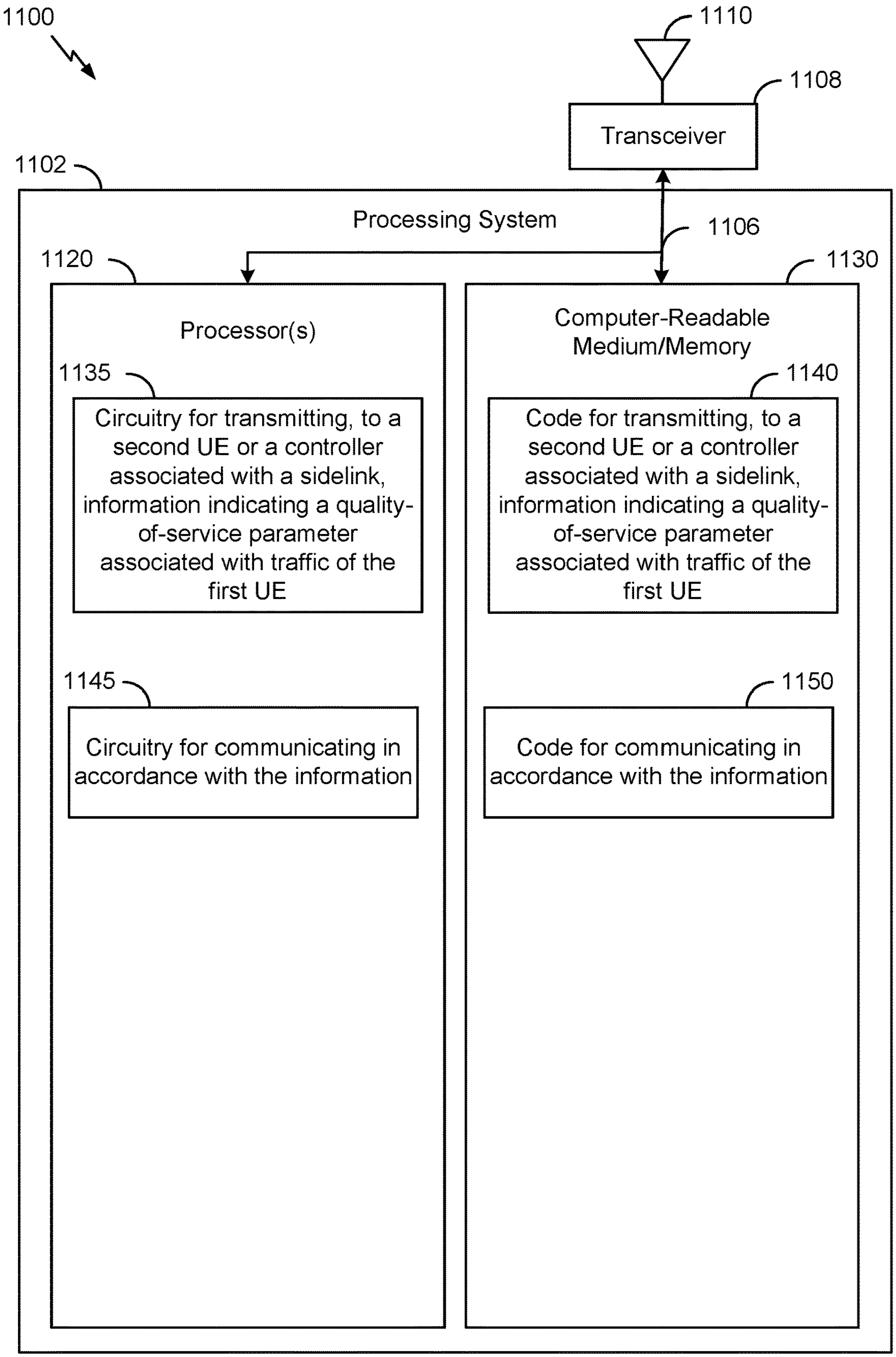
FIG. 11 is a diagram illustrating an example of an implementation of code and circuitry for a communications device, in accordance with the present disclosure.

In one aspect, method 900, or any aspect related to it, may be performed by an apparatus, such as communications device 1100 of FIG. 11, which includes various components operable, configured, or adapted to perform the method 900. Communications device 1100 is described below in further detail.

Note that FIG. 9 is just one example of a method, and other methods including fewer, additional, or alternative steps are possible consistent with this disclosure.

Figure 10:
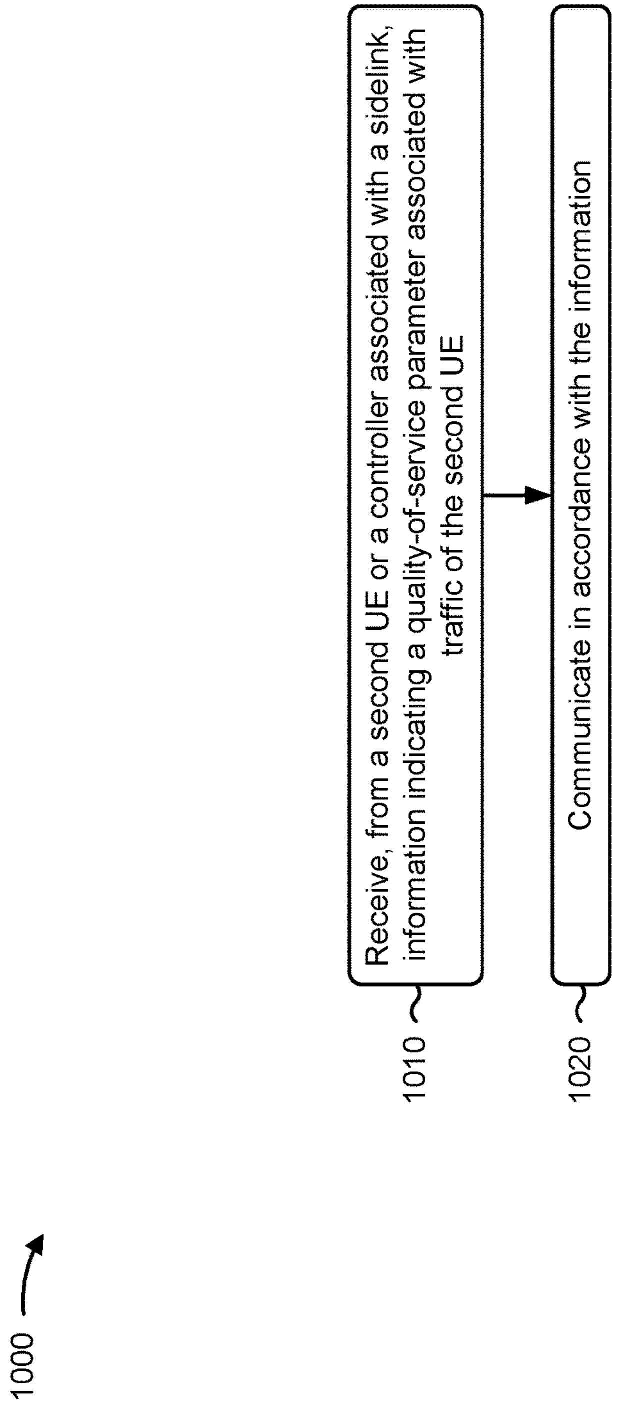
FIG. 10 shows a method for wireless communications by a first UE.

FIG. 10 shows a method 1000 for wireless communications by a first UE (e.g., the second UE of FIG. 8), such as UE 120.

Method 1000 begins at 1010 with receiving, from a second UE or a controller associated with a sidelink, information indicating a quality-of-service parameter associated with traffic of the second UE.

Method 1000 then proceeds to step 1020 with communicating in accordance with the information.

In a first aspect, the information indicates delay information or a priority parameter for the traffic.

In a second aspect, alone or in combination with the first aspect, receiving the information comprises receiving the information via a groupcast transmission or a broadcast transmission.

In a third aspect, alone or in combination with one or more of the first and second aspects, the information indicates the quality-of-service parameter or a priority parameter of a logical channel group of the traffic.

In a fourth aspect, alone or in combination with one or more of the first through third aspects, the information indicates one or more time intervals in which the traffic is expected.

In a fifth aspect, alone or in combination with one or more of the first through fourth aspects, the information indicates a configured grant for the traffic.

In a sixth aspect, alone or in combination with one or more of the first through fifth aspects, communicating in accordance with the information comprises receiving the traffic on the sidelink.

In a seventh aspect, alone or in combination with one or more of the first through sixth aspects, communicating in accordance with the information comprises transmitting a communication on an uplink in accordance with the information.

In an eighth aspect, alone or in combination with one or more of the first through seventh aspects, the information indicates one or more time intervals in which the traffic is expected, and communicating in accordance with the information comprises transmitting a communication in a time interval other than the one or more time intervals.

In a ninth aspect, alone or in combination with one or more of the first through eighth aspects, transmitting the communication in the time interval other than the one or more time intervals is based at least in part on a packet delay budget of the traffic indicated by the information.

In a tenth aspect, alone or in combination with one or more of the first through ninth aspects, communicating in accordance with the information comprises transmitting a communication using a transmission configuration based at least in part on the communication overlapping with the traffic.

In an eleventh aspect, alone or in combination with one or more of the first through tenth aspects, the transmission configuration indicates a modification of at least one of a modulation and coding scheme, a power control parameter, or a transmit power based at least in part on the communication overlapping with the traffic.

In a twelfth aspect, alone or in combination with one or more of the first through eleventh aspects, the transmission configuration indicates a modification of a resource allocation for the communication based at least in part on the communication overlapping with the traffic.

In a thirteenth aspect, alone or in combination with one or more of the first through twelfth aspects, communicating in accordance with the information comprises transmitting a communication on a first resource that is non-overlapped with a second resource of the traffic.

In a fourteenth aspect, alone or in combination with one or more of the first through thirteenth aspects, the first resource is a configured grant resource.

In a fifteenth aspect, alone or in combination with one or more of the first through fourteenth aspects, the configured grant resource is one of a plurality of configured grant resources of the first UE.

In a sixteenth aspect, alone or in combination with one or more of the first through fifteenth aspects, the information indicates the second resource of the traffic.

In a seventeenth aspect, alone or in combination with one or more of the first through sixteenth aspects, method 1000 includes selecting the first resource based at least in part on the information or a scrambling identifier.

Figure 12:
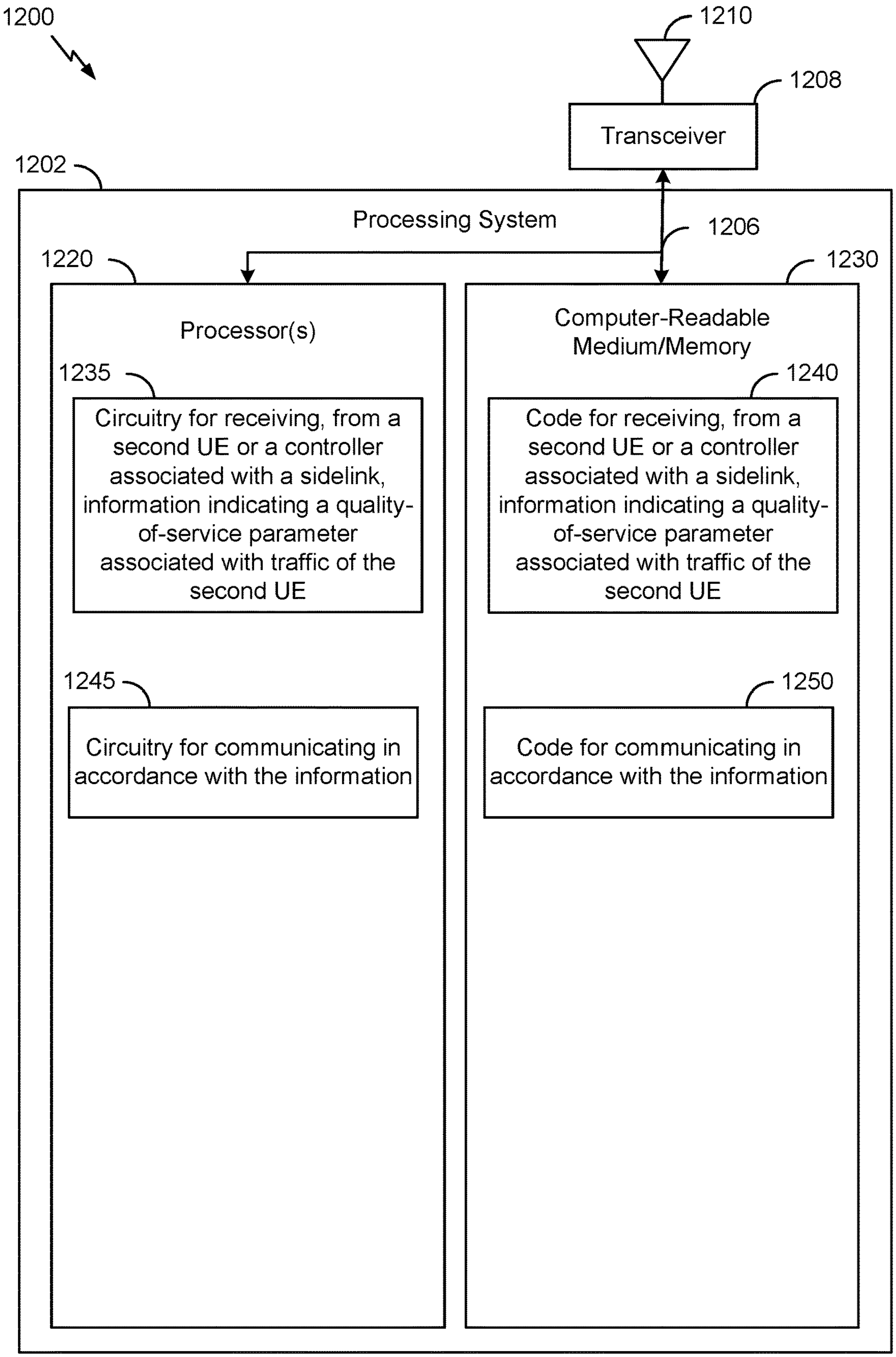
FIG. 12 is a diagram illustrating an example of an implementation of code and circuitry for a communications device, in accordance with the present disclosure.

In one aspect, method 1000, or any aspect related to it, may be performed by an apparatus, such as communications device 1200 of FIG. 12, which includes various components operable, configured, or adapted to perform the method 1000. Communications device 1200 is described below in further detail.

Note that FIG. 10 is just one example of a method, and other methods including fewer, additional, or alternative steps are possible consistent with this disclosure.

FIG. 11 is a diagram illustrating an example of an implementation of code and circuitry for a communications device 1100, in accordance with the present disclosure.

The communications device 1100 may be a UE (e.g., the first UE of FIG. 8), or a UE may include the communications device 1100.

The communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes one or more processors 1120. In various aspects, the one or more processors 1120 may be representative of one or more of receive processor 258, transmit processor 264, TX MIMO processor 266, and/or controller/processor 280, as described with respect to FIG. 2. The one or more processors 1120 are coupled to a computer-readable medium/memory 1130 via a bus 1106. In various aspects, the computer-readable medium/memory 1130 may be representative of memory 282, as described with respect to FIG. 2. In certain aspects, the computer-readable medium/memory 1130 is configured to store instructions (e.g., computer-executable code, processor-executable code) that when executed by the one or more processors 1120, cause the one or more processors 1120 to perform the method 900 described with respect to FIG. 9, or any aspect related to it. Note that reference to a processor performing a function of communications device 1100 may include one or more processors performing that function of communications device 1100.

As shown in FIG. 11, the communications device 1100 may include circuitry for transmitting, to a second UE or a controller associated with a sidelink, information indicating a quality-of-service parameter associated with traffic of the first UE (circuitry 1135).

As shown in FIG. 11, the communications device 1100 may include, stored in computer-readable medium/memory 1130, code for transmitting, to a second UE or a controller associated with a sidelink, information indicating a quality-of-service parameter associated with traffic of the first UE (code 1140).

As shown in FIG. 11, the communications device 1100 may include circuitry for communicating in accordance with the information (circuitry 1145).

As shown in FIG. 11, the communications device 1100 may include, stored in computer-readable medium/memory 1130, code for communicating in accordance with the information (code 1150).

Various components of the communications device 1100 may provide means for performing the method 900 described with respect to FIG. 9, or any aspect related to it. For example, means for transmitting, sending, or outputting for transmission may include the transceiver(s) 254 and/or antenna(s) 252 of the UE 120 and/or transceiver 1108 and antenna 1110 of the communications device 1100 in FIG. 11. Means for receiving or obtaining may include the transceiver(s) 254 and/or antenna(s) 252 of the UE 120 and/or transceiver 1108 and antenna 1110 of the communications device 1100 in FIG. 11.

FIG. 11 is provided as an example. Other examples may differ from what is described in connection with FIG. 11.

FIG. 12 is a diagram illustrating an example of an implementation of code and circuitry for a communications device 1200, in accordance with the present disclosure. The communications device 1200 may be a UE (e.g., the second UE of FIG. 8), or a UE may include the communications device 1200.

The communications device 1200 includes a processing system 1202 coupled to a transceiver 1208 (e.g., a transmitter and/or a receiver). The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes one or more processors 1220. In various aspects, the one or more processors 1220 may be representative of one or more of receive processor 258, transmit processor 264, TX MIMO processor 266, and/or controller/processor 280, as described with respect to FIG. 2. The one or more processors 1220 are coupled to a computer-readable medium/memory 1230 via a bus 1206. In various aspects, the computer-readable medium/memory 1230 may be representative of memory 282, as described with respect to FIG. 2. In certain aspects, the computer-readable medium/memory 1230 is configured to store instructions (e.g., computer-executable code, processor-executable code) that when executed by the one or more processors 1220, cause the one or more processors 1220 to perform the method 1000 described with respect to FIG. 10, or any aspect related to it. Note that reference to a processor performing a function of communications device 1200 may include one or more processors performing that function of communications device 1200.

As shown in FIG. 12, the communications device 1200 may include circuitry for receiving, from a second UE or a controller associated with a sidelink, information indicating a quality-of-service parameter associated with traffic of the second UE (circuitry 1235).

As shown in FIG. 12, the communications device 1200 may include, stored in computer-readable medium/memory 1230, code for receiving, from a second UE or a controller associated with a sidelink, information indicating a quality-of-service parameter associated with traffic of the second UE (code 1240).

As shown in FIG. 12, the communications device 1200 may include circuitry for communicating in accordance with the information (circuitry 1245).

As shown in FIG. 12, the communications device 1200 may include, stored in computer-readable medium/memory 1230, code for communicating in accordance with the information (code 1250).

Various components of the communications device 1200 may provide means for performing the method 1000 described with respect to FIG. 10, or any aspect related to it. For example, means for transmitting, sending, or outputting for transmission may include the transceiver(s) 254 and/or antenna(s) 252 of the UE 120 and/or transceiver 1208 and antenna 1210 of the communications device 1200 in FIG. 12. Means for receiving or obtaining may include the transceiver(s) 254 and/or antenna(s) 252 of the UE 120 and/or transceiver 1208 and antenna 1210 of the communications device 1200 in FIG. 12.

FIG. 12 is provided as an example. Other examples may differ from what is described in connection with FIG. 12.

The following provides an overview of some Aspects of the present disclosure:

Aspect 1: A method of wireless communication performed by a first user equipment (UE), comprising: transmitting, to a second UE or a controller associated with a sidelink, information indicating a quality-of-service parameter associated with traffic of the first UE; and communicating in accordance with the information.

Aspect 2: The method of Aspect 1, wherein the information indicates delay information or a priority parameter for the traffic.

Aspect 3: The method of any of Aspects 1-2, wherein transmitting the information comprises transmitting the information to a set of UEs or a set of controllers having a radio resource control connection with the first UE.

Aspect 4: The method of any of Aspects 1-3, wherein transmitting the information comprises transmitting the information via a groupcast transmission or a broadcast transmission.

Aspect 5: The method of any of Aspects 1-4, wherein the information indicates the quality-of-service parameter or a priority parameter of a logical channel group of the traffic.

Aspect 6: The method of any of Aspects 1-5, wherein transmitting the information comprises transmitting the information in accordance with a periodicity.

Aspect 7: The method of any of Aspects 1-6, wherein transmitting the information comprises transmitting the information via one of physical layer signaling, medium access control layer signaling, or radio resource control layer signaling.

Aspect 8: The method of any of Aspects 1-7, wherein the information indicates one or more time intervals in which the traffic is expected.

Aspect 9: The method of any of Aspects 1-8, wherein the information indicates a configured grant for the traffic.

Aspect 10: The method of any of Aspects 1-9, wherein the traffic is sidelink traffic.

Aspect 11: The method of any of Aspects 1-10, wherein the traffic is uplink traffic.

Aspect 12: A method of wireless communication performed by a first user equipment (UE), comprising: receiving, from a second UE or a controller associated with a sidelink, information indicating a quality-of-service parameter associated with traffic of the second UE; and communicating in accordance with the information.

Aspect 13: The method of Aspect 12, wherein the information indicates delay information or a priority parameter for the traffic.

Aspect 14: The method of any of Aspects 12-13, wherein receiving the information comprises receiving the information via a groupcast transmission or a broadcast transmission.

Aspect 15: The method of any of Aspects 12-14, wherein the information indicates the quality-of-service parameter or a priority parameter of a logical channel group of the traffic.

Aspect 16: The method of any of Aspects 12-15, wherein the information indicates one or more time intervals in which the traffic is expected.

Aspect 17: The method of any of Aspects 12-16, wherein the information indicates a configured grant for the traffic.

Aspect 18: The method of any of Aspects 12-17, wherein communicating in accordance with the information comprises receiving the traffic on the sidelink.

Aspect 19: The method of any of Aspects 12-18, wherein communicating in accordance with the information comprises transmitting a communication on an uplink in accordance with the information.

Aspect 20: The method of any of Aspects 12-19, wherein the information indicates one or more time intervals in which the traffic is expected, and wherein communicating in accordance with the information comprises transmitting a communication in a time interval other than the one or more time intervals.

Aspect 21: The method of Aspect 20, wherein transmitting the communication in the time interval other than the one or more time intervals is based at least in part on a packet delay budget of the traffic indicated by the information.

Aspect 22: The method of any of Aspects 12-21, wherein communicating in accordance with the information comprises transmitting a communication using a transmission configuration based at least in part on the communication overlapping with the traffic.

Aspect 23: The method of Aspect 22, wherein the transmission configuration indicates a modification of at least one of a modulation and coding scheme, a power control parameter, or a transmit power based at least in part on the communication overlapping with the traffic.

Aspect 24: The method of Aspect 22, wherein the transmission configuration indicates a modification of a resource allocation for the communication based at least in part on the communication overlapping with the traffic.

Aspect 25: The method of any of Aspects 12-24, wherein communicating in accordance with the information comprises transmitting a communication on a first resource that is non-overlapped with a second resource of the traffic.

Aspect 26: The method of Aspect 25, wherein the first resource is a configured grant resource.

Aspect 27: The method of Aspect 26, wherein the configured grant resource is one of a plurality of configured grant resources of the first UE.

Aspect 28: The method of Aspect 25, wherein the information indicates the second resource of the traffic.

Aspect 29: An apparatus for wireless communication at a device, comprising a processor; memory coupled with the processor; and instructions stored in the memory and executable by the processor to cause the apparatus to perform the method of one or more of Aspects 1-28.

Aspect 30: A device for wireless communication, comprising a memory and one or more processors coupled to the memory, the one or more processors configured to perform the method of one or more of Aspects 1-28.

Aspect 31: An apparatus for wireless communication, comprising at least one means for performing the method of one or more of Aspects 1-28.

Aspect 32: A non-transitory computer-readable medium storing code for wireless communication, the code comprising instructions executable by a processor to perform the method of one or more of Aspects 1-28.

Aspect 33: A non-transitory computer-readable medium storing a set of instructions for wireless communication, the set of instructions comprising one or more instructions that, when executed by one or more processors of a device, cause the device to perform the method of one or more of Aspects 1-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules, and circuits described in connection with the present disclosure may be implemented or performed with a general purpose processor, a digital signal processor (DSP), an application-specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices (e.g., a combination of a DSP and a microprocessor, a plurality of microprocessors, one or more microprocessors in conjunction with a DSP core, a system on a chip (SoC), or any other such configuration).

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or a processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communication performed by a first user equipment (UE), comprising:

transmitting, to a second UE or a controller associated with a sidelink, information indicating a quality-of-service parameter associated with the first UE and one or more time intervals in which traffic of the first UE is expected, wherein a configured grant (CG) configuration indicates the quality-of-service parameter; and communicating, with the second UE in accordance with the information, during the one or more time intervals, wherein communicating in accordance with the information comprises receiving a communication from the second UE in a time interval, of the one or more time intervals, overlapping the traffic, and wherein a transmit power for the communication is lower than another transmit power for another communication from the second UE that does not overlap the traffic, wherein the information comprises a bitmap indicating the one or more time intervals, wherein each bit of the bitmap corresponds to a respective time interval of the one or more time intervals, and wherein a respective size of a respective time interval that corresponds to a respective bit is configurable.

2. The method of claim 1, wherein the information indicates delay information or a priority parameter for the traffic.

3. The method of claim 1, wherein transmitting the information comprises transmitting the information to a set of UEs or a set of controllers having a radio resource control connection with the first UE.

4. The method of claim 1, wherein transmitting the information comprises transmitting the information via a groupcast transmission or a broadcast transmission.

5. The method of claim 1, wherein the information indicates the quality-of-service parameter and a priority parameter of a logical channel group of the traffic.

6. The method of claim 1, wherein transmitting the information comprises transmitting the information in accordance with a periodicity.

7. The method of claim 1, wherein transmitting the information comprises transmitting the information via one of physical layer signaling, medium access control layer signaling, or radio resource control layer signaling.

8. The method of claim 1, wherein the information indicates a CG for the traffic.

9. The method of claim 1, wherein the traffic is sidelink traffic.

10. The method of claim 1, wherein the traffic is uplink traffic.

11. A method of wireless communication performed by a first user equipment (UE), comprising:

receiving, from a second UE or a controller associated with a sidelink, information indicating a quality-of-service parameter associated with the second UE and one or more time intervals in which traffic of the second UE is expected, wherein a configured grant (CG) configuration indicates the quality-of-service parameter; and communicating with the second UE in accordance with the information during the one or more time intervals, wherein communicating in accordance with the information comprises transmitting a communication to the second UE in a time interval, of the one or more time intervals, overlapping the traffic, and wherein a transmit power for the communication is lower than another transmit power for another communication to the second UE that does not overlap the traffic, wherein the information comprises a bitmap indicating the one or more time intervals, wherein each bit of the bitmap corresponds to a respective time interval of the one or more time intervals, and wherein a respective size of a respective time interval that corresponds to a respective bit is configurable.

12. The method of claim 11, wherein the information indicates delay information or a priority parameter for the traffic.

13. The method of claim 11, wherein receiving the information comprises receiving the information via a groupcast transmission or a broadcast transmission.

14. The method of claim 11, wherein the information indicates the quality-of-service parameter and a priority parameter of a logical channel group of the traffic.

15. The method of claim 11, wherein the information indicates a CG for the traffic.

16. The method of claim 11, wherein communicating in accordance with the information comprises receiving the traffic on the sidelink.

17. The method of claim 11, further comprising:

transmitting on an uplink in accordance with the information.

18. The method of claim 11, wherein communicating with the second UE in accordance with the information further comprises:

transmitting another communication in a time interval other than the one or more time intervals based at least in part on a packet delay budget of the traffic indicated by the information.

19. The method of claim 11, wherein communicating in accordance with the information comprises transmitting the communication using a transmission configuration based at least in part on the communication overlapping with the traffic.

20. The method of claim 19, wherein the transmission configuration indicates a modification of at least one of a modulation and coding scheme or a power control parameter based at least in part on the communication overlapping with the traffic.

21. The method of claim 19, wherein the transmission configuration indicates a modification of a resource allocation for the communication based at least in part on the communication overlapping with the traffic.

22. The method of claim 11, wherein communicating in accordance with the information comprises transmitting the communication on a first resource that is non-overlapped with a second resource of the traffic.

23. The method of claim 22, wherein the first resource is a CG resource.

24. The method of claim 23, wherein the CG resource is one of a plurality of CG resources of the first UE.

25. The method of claim 22, wherein the information indicates the second resource of the traffic.

26. A first user equipment (UE), comprising:

one or more antennas; and a processing system that includes one or more processors and one or more memories that store code and are coupled with the one or more processors, the processing system configured to cause the first UE to:

transmit, to a second UE or a controller associated with a sidelink, information indicating a quality-of-service parameter associated with the first UE and one or more time intervals in which traffic of the first UE is expected, wherein a configured grant (CG) configuration indicates the quality-of-service parameter; and communicate, with the second UE in accordance with the information, during the one or more time intervals, wherein, to communicate in accordance with the information, the processing system is configured to cause the first UE to receive a communication from the second UE in a time interval, of the one or more time intervals, overlapping the traffic, and wherein a transmit power for the communication is lower than another transmit power for another communication from the second UE that does not overlap the traffic, wherein the information comprises a bitmap indicating the one or more time intervals, wherein each bit of the bitmap corresponds to a respective time interval of the one or more time intervals, and wherein a respective size of a respective time interval that corresponds to a respective bit is configurable.

27. A first user equipment (UE), comprising:

one or more antennas; and a processing system that includes one or more processors and one or more memories that store code and are coupled with the one or more processors, the processing system configured to cause the first UE to:

receive, from a second UE or a controller associated with a sidelink, information indicating a quality-of-service parameter associated with the second UE and one or more time intervals in which traffic of the second UE is expected, wherein a configured grant (CG) configuration indicates the quality-of-service parameter; and communicate with the second UE in accordance with the information during the one or more time intervals, wherein, to communicate in accordance with the information, the processing system is configured to cause the first UE to transmit a communication to the second UE in a time interval, of the one or more time intervals, overlapping the traffic, and wherein a transmit power for the communication is lower than another transmit power for another communication to the second UE that does not overlap the traffic, wherein the information comprises a bitmap indicating the one or more time intervals, wherein each bit of the bitmap corresponds to a respective time interval of the one or more time intervals, and wherein a respective size of a respective time interval that corresponds to a respective bit is configurable.

28. The first UE of claim 27, wherein, to communicate in accordance with the information, the processing system is further configured to cause the first UE to:

transmit another communication in a time interval other than the one or more time intervals based at least in part on a packet delay budget of the traffic indicated by the information.

29. The first UE of claim 27, wherein the information indicates delay information or a priority parameter for the traffic.

* * * * *